(12) United States Patent
Kayama et al.

(10) Patent No.: US 11,767,779 B2
(45) Date of Patent: Sep. 26, 2023

(54) EXHAUST GAS PURIFYING FILTER

(71) Applicant: DENSO CORPORATION, Kariya (JP)

(72) Inventors: Hiroaki Kayama, Kariya (JP); Kazuhiko Koike, Nisshin (JP)

(73) Assignee: DENSO CORPORATION, Kariya (JP)

( * ) Notice: Subject to any disclaimer, the term of this patent is extended or adjusted under 35 U.S.C. 154(b) by 85 days.

(21) Appl. No.: 17/451,823

(22) Filed: Oct. 22, 2021

(65) Prior Publication Data

US 2022/0042435 A1 Feb. 10, 2022

Related U.S. Application Data

(63) Continuation of application No. PCT/JP2020/011408, filed on Mar. 16, 2020.

(30) Foreign Application Priority Data

Apr. 26, 2019 (JP) .................. 2019-086488

(51) Int. Cl.
*F01N 3/10* (2006.01)
*B01J 35/04* (2006.01)
*B01J 35/10* (2006.01)

(52) U.S. Cl.
CPC ................ *F01N 3/10* (2013.01); *B01J 35/04* (2013.01); *B01J 35/1033* (2013.01); *B01J 35/1076* (2013.01); *F01N 2570/12* (2013.01)

(58) Field of Classification Search
CPC .......... B01D 46/2425; B01D 46/24491; B01D 53/72; B01D 53/8687; B01D 53/92; B01D 53/922; B01D 2201/184; B01D 2255/9155; B01D 2255/9205; B01J 35/04; B01J 35/1033; B01J 35/1076; F01N 3/10; F01N 2570/12; F01N 3/0222; F01N 3/035; F01N 2250/02
See application file for complete search history.

(56) References Cited

U.S. PATENT DOCUMENTS

| | | | |
|---|---|---|---|
| 2006/0107641 A1 | 5/2006 | Kasai et al. | |
| 2012/0009093 A1* | 1/2012 | Mizutani | C04B 35/63416 422/177 |
| 2013/0136662 A1* | 5/2013 | Choi | B01J 35/1019 156/60 |
| 2017/0095798 A1* | 4/2017 | Onoe | F01N 3/035 |
| 2019/0134563 A1* | 5/2019 | Moorthy | F01N 3/0226 |
| 2021/0189930 A1 | 6/2021 | Sugawara | |

FOREIGN PATENT DOCUMENTS

| | | | | |
|---|---|---|---|---|
| EP | 2 105 199 A1 * | 9/2009 | | B01D 53/94 |
| EP | 2 324 904 A2 * | 5/2011 | | B01D 53/94 |
| WO | WO 2016 060 030 A1 * | 4/2016 | | B01D 53/94 |

* cited by examiner

*Primary Examiner* — Timothy C Vanoy
(74) *Attorney, Agent, or Firm* — Nixon & Vanderhye P.C.

(57) ABSTRACT

Provided is an exhaust gas purifying filter used with a HC purifying catalyst supported thereon. Numerous pores are formed in partitions of the exhaust gas purifying filter. In a cross-section of the partition, pores are open at a passage surface, having an open end of which the opening diameter is 50 μm or larger. In the cross-section of the partitions, the partitions include a narrow part where a pore diameter is 5 μm or more and the pore diameter becomes a minimum in a region. In the cross-section of the partitions, the region is positioned between a pair of virtual lines $L_1$ and $L_2$ extending from opposing sides of the opening end to a passage surface positioned opposite to the opening end along the wall thickness direction X, Z. The pore diameter at the narrow part is 6% or more and less than or equal to 20% of the opening diameter.

6 Claims, 13 Drawing Sheets

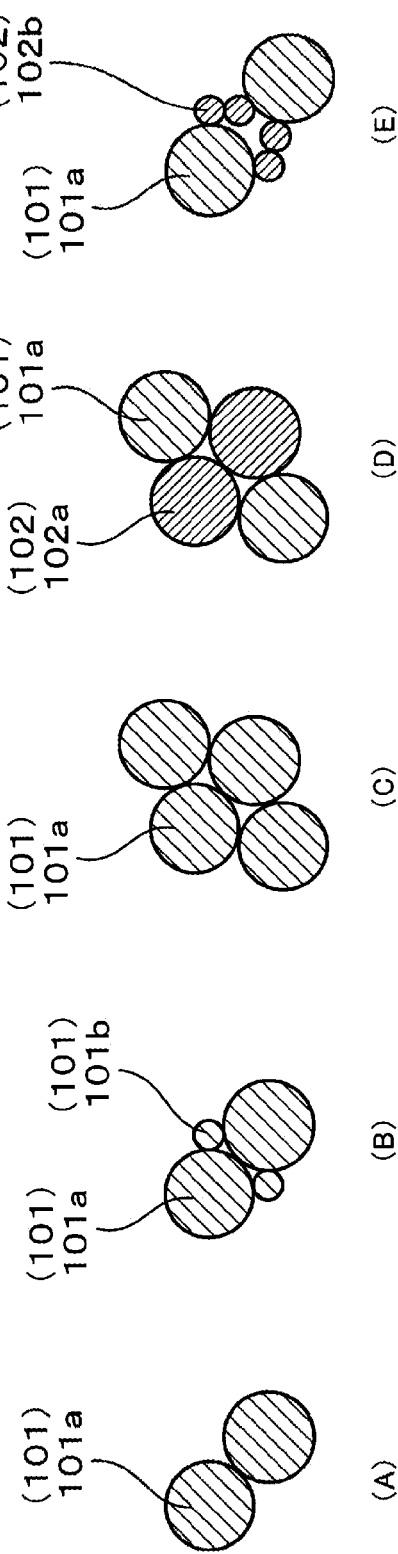

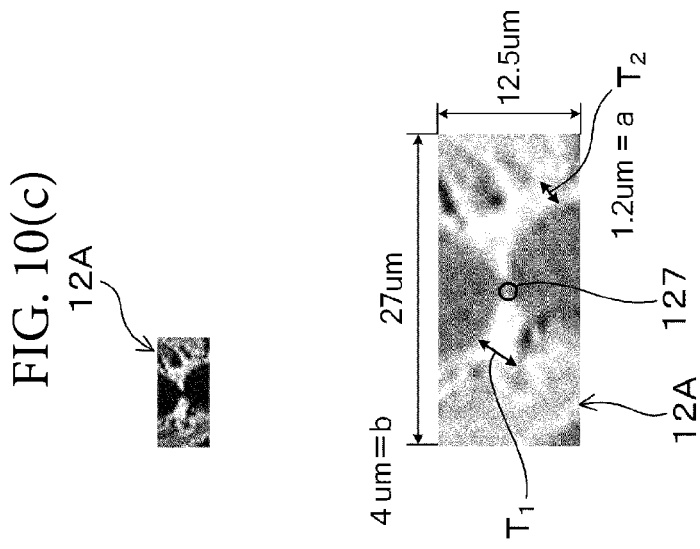
FIG. 10(c)
FIG. 10(d)
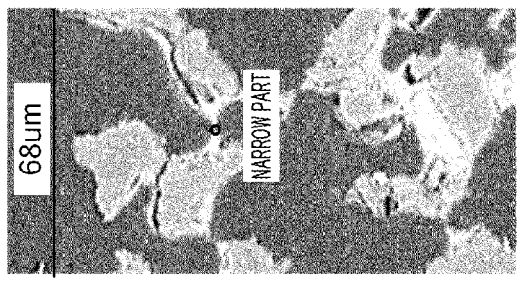
FIG. 10(b)
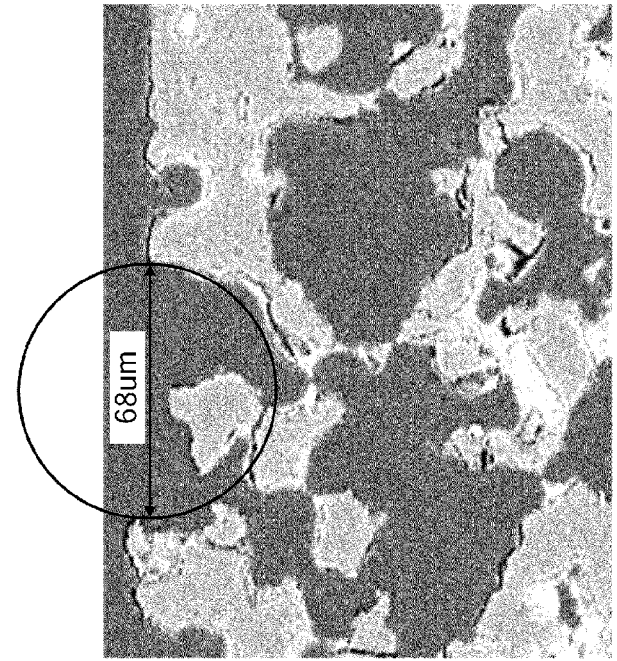
FIG. 10(a)

EXHAUST GAS PURIFYING FILTER

CROSS REFERENCE TO RELATED APPLICATION

This application is the U.S. bypass continuation application of International Application No. PCT/JP2020/011408 filed on Mar. 16, 2020, which designated the U.S. and claims priority to Japanese Patent Application No. 2019-086488 filed on Apr. 26, 2019, the contents of both of these are incorporated herein by reference.

BACKGROUND

Technical Field

The present disclosure relates to an exhaust gas purifying filter used with carrying purification catalyst.

Description of the Related Art

In an exhaust gas emitted from an internal combustion engine, such as a diesel engine and a gasoline engine, or a heat engine such as a boiler, particulate matter referred to as particulates is contained. The exhaust gas purifying filter is used for collecting PM contained in the exhaust gas.

The exhaust gas purifying filter generally includes a plurality of cells which are divided by porous partitions, and an opening sealed portion that seals one end of opposing ends of the cell. The exhaust purifying filter is required to reduce a pressure loss and collect PM contained in the exhaust gas to be in the pores of the partitions.

SUMMARY

The present disclosure provides an exhaust gas purifying filer capable of exhibiting excellent purifying performance for HC by supporting a catalyst. One aspect of the present disclosure is an exhaust gas purifying filter used with a HC purifying catalyst carried thereon, including: a honeycomb structure part having a partition including numerous pores formed therein, and a plurality of cells divided by the partitions, forming a passage for an exhaust gas; and an opening sealed portion that alternately seals an inflow end surface or an outflow end surface of the exhaust gas in the cells.

BRIEF DESCRIPTION OF THE DRAWINGS

FIG. 6 is a schematic view showing an arrangement pattern of particle material according to the first embodiment;

FIG. 10 is a set of diagrams in which FIG. 10 (a) is a photographic image showing an example of a scanning electron microscopic image of a cross-sectioned partition where a catalyst layer is formed according to the experiment example 1, FIG. 10 (b) is a photographic image showing a part of FIG. 10 (a), FIG. 10 (c) a photographic image showing a part of FIG. 10 (b) and FIG. 10 (d) is an enlarged view of FIG. 10 (c);

DETAILED DESCRIPTION OF PREFERRED EMBODIMENTS

Figure 1:
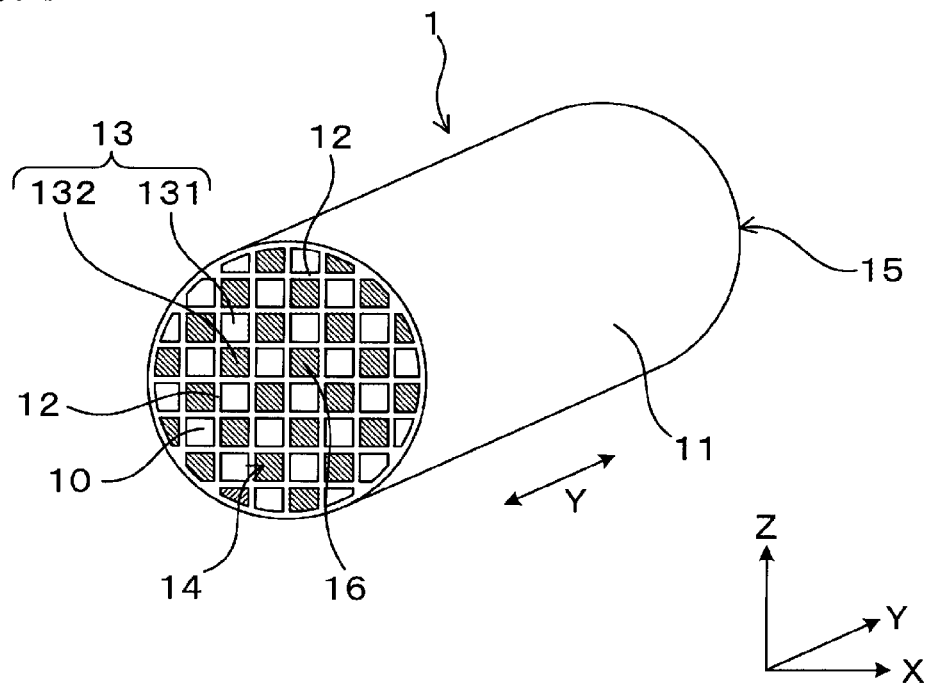
FIG. 1 is a perspective view showing an exhaust gas purifying filter according to a first embodiment of the present disclosure.

In an exhaust gas emitted from an internal combustion engine, such as a diesel engine and a gasoline engine, or a heat engine such as a boiler, particulate matter referred to as particulates is contained. The particulate matter is hereinafter referred to as PM. The exhaust gas purifying filter is used for collecting PM contained in the exhaust gas.

The exhaust gas purifying filter generally includes a plurality of cells which are divided by porous partitions, and an opening sealed portion that seals one end of opposing ends of the cell. The exhaust purifying filter is required to reduce a pressure loss and collect PM contained in the exhaust gas to be in the pores of the partitions. Note that the pressure loss is sometimes referred to as P-loss. For example, Japanese patent number 4473693 discloses a filter in which the porosity is from 45% to 70%, a predetermined average pore diameter difference ratio is or less than or equal to 35%, an average pore diameter is from 15 µm to 30 µm, and the maximum pore diameter measured by a bubble point method is 150 µm or less. According to PTL1, by adopting the above-described configurations, a P-loss when PM is being deposited can be reduced.

In recent years, since it is required to apply a purifying function for toxic substances such as HC using the exhaust gas purifying filter, for example, an HC purifying catalyst is carried on the exhaust gas purifying filter. Note that HC refers to generic term hydrocarbon.

Since HC has a high diffusion rate in the catalytic layer formed after supporting the catalyst it does not sufficiently react with the catalyst and easily passes therethrough. For purifying HC, the larger the thickness of the catalytic layer, the more advantageous it is for purifying HC. However, according to a conventional exhaust gas purifying filter as disclosed by PTL1, the catalyst layer is unlikely to have a sufficiently large thickness to purify HC. Therefore, the purifying performance for HC after supporting the catalyst thereon is required to be further improved.

Hereinafter, with reference to the drawings, embodiments of the present disclosure will be described.

First Embodiment

With reference to FIGS. 1 to 6, an embodiment of an exhaust gas purifying filter 1 will be described. As exemplified in FIGS. 1 to 3, the exhaust gas purifying filter 1 includes honeycomb structure part 10 and an opening sealed portion 16. The honeycomb structure part 10 is constituted of, for example, ceramic such as cordierite and includes an outer skin 11, partition 12 and a cell 13.

Figure 2:
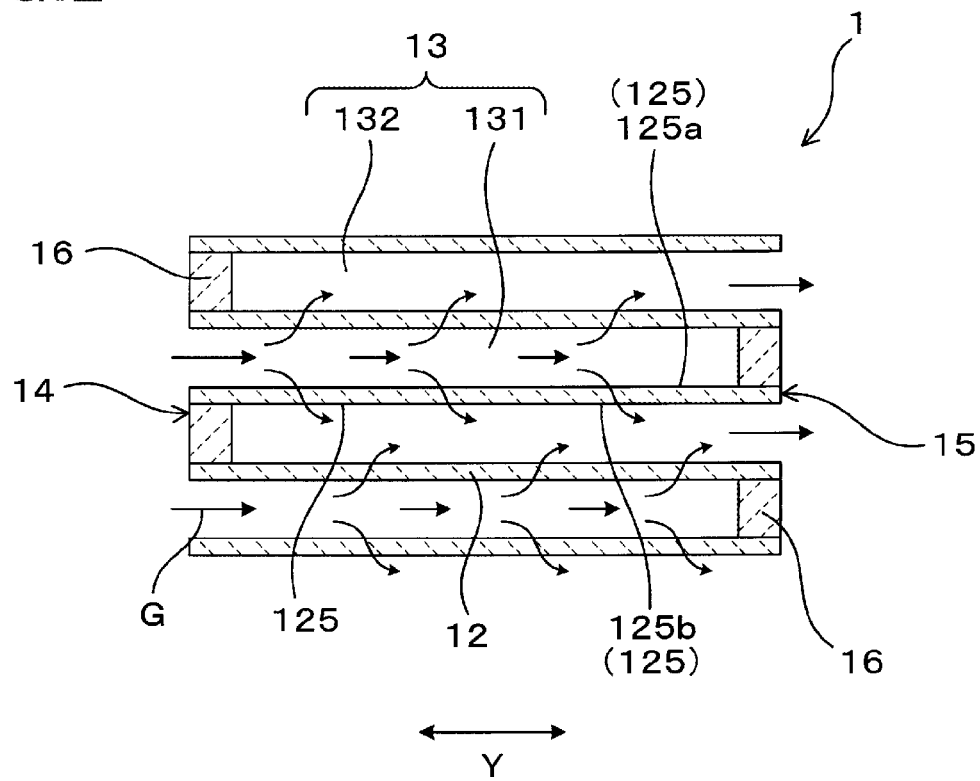
FIG. 2 is an enlarged cross-sectional view sectioned in the axial direction of the exhaust gas purifying filter according to the first embodiment.

As shown in FIGS. 1 and 2, the outer skin 11 is formed as a cylindrical body. The specific shape of the outer skin 11 is a cylindrical shape in which the cross-sectional shape sectioned along a direction orthogonal to the axial direction is a circular shape, but the outer skin 11 may be formed in a polygonal shape in which the cross-sectional shape is a polygon such as a square. According to the present embodiment, the axial direction Y of the outer skin 11 having the cylindrical shape is defined as an axial direction Y of the exhaust gas purifying filter 1. Note that each arrow shown in FIG. 2 indicates a direction along which the exhaust gas G flows in the case where the exhaust gas purifying filter 1 is disposed in a passage such as the exhaust gas pipe where exhaust gas G flows through.

Figure 3A:
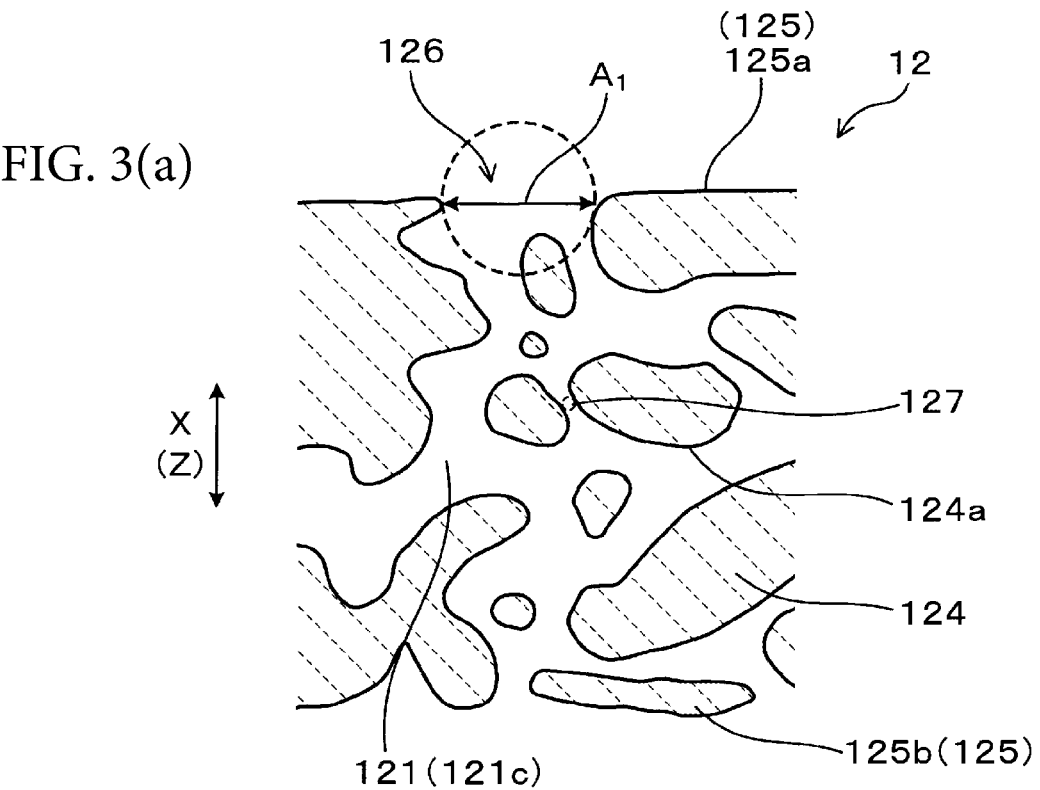
FIG. 3 is a set of diagrams in which FIG. 3 (a) is an enlarged cross-sectional schematic view of a partition showing an opening diameter of an opening according to the first embodiment and FIG. 3 (b) is an enlarged cross-sectional schematic view of a partition especially showing a region A surrounding by a virtual line according to the first embodiment.
Figure 3B:
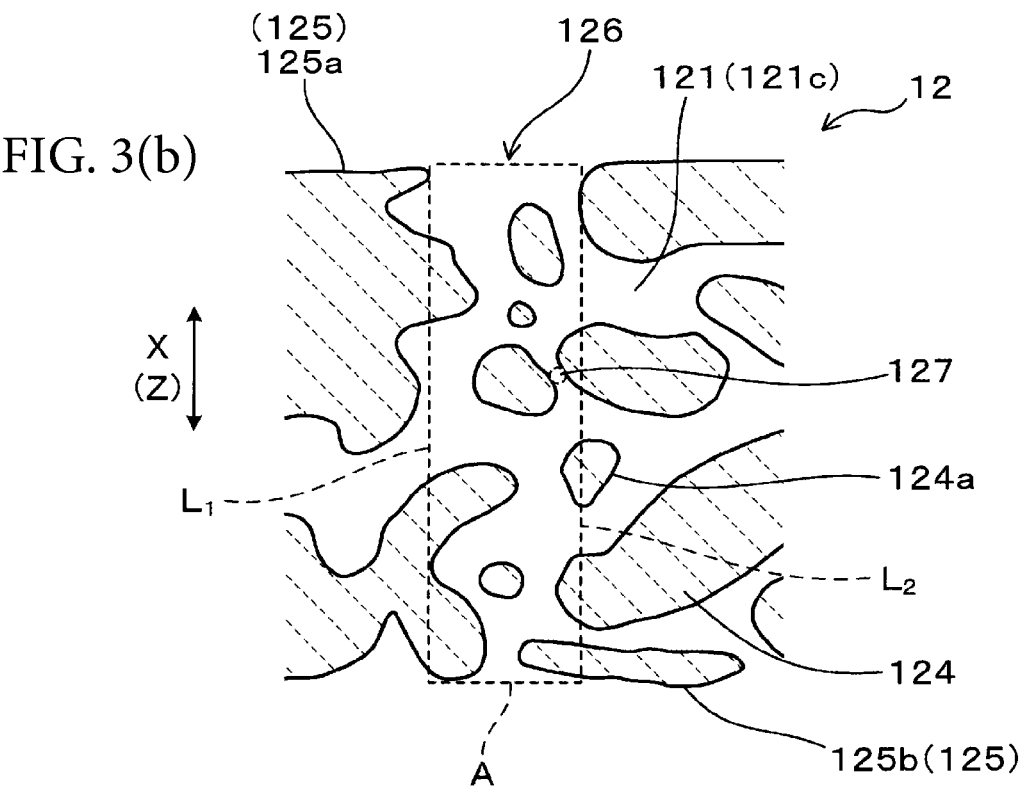

The partition 12 divides a region inside the outer skin 11 into a plurality of cells 13. The partitions 21 are generally referred to as cell walls. The partition 12 is provided in a lattice shape. The exhaust gas purifying filter 1 is formed as a porous body, and numerous pores 121 are formed in the partition 12 as shown in FIG. 3. Hence, the exhaust gas purifying filter 1 is able to cause PM contained in the exhaust gas G to be deposited on a surface of the partition 12 and in the pores 121, thereby collecting it. The pores 121 are sometimes generally referred to as holes. PM refers to fine particles, called particulate substances, particulate matter or particulates. The outer skin 11 and the partition 12 are integrally formed.

As shown in FIGS. 1 and 2, the exhaust gas purifying filter 1 includes a plurality of cells 13. The cells 13 are surrounded by partitions 12 to form a passage for the exhaust gas G. An extending direction of the cells 13 usually matches the axial direction Y.

As shown in FIG. 1, a cell shape at a cross-section sectioned along a direction orthogonal to the axial direction Y is, for example, a square shape, but it is not limited thereto. The cell shape may be a polygonal shape such as a triangle shape, a square shape and a hexagonal shape, or a circular shape.

The exhaust gas purifying filter 1 is used when a HC purifying catalyst is supported thereon. Hence, the exhaust gas purifying filter 1 before supporting the catalyst can be a base material for supporting the HC purifying catalyst. The HC purifying catalyst is carried by at least the partition 12. The exhaust gas purifying filter 1 may have a support surface for supporting the HC purifying catalyst in the partition 12. The carrying surface is, for example, a passage surface 125 and a pore wall surface 124a as shown in FIGS. 2 to 5. The HC purifying catalyst is carried by the partition 12 as a catalyst layer 17.

The exhaust gas purifying filter 1 is, for example, a cylinder body such as a columnar body and the dimension thereof may be appropriately changed. The exhaust gas purifying filter 1 includes an inflow end surface 14 and an outflow end surface 15 at both ends thereof in the axial direction Y. The inflow end surface 14 serves as an end surface where the exhaust gas G flows in under a state where the exhaust gas purifying filter 1 is disposed in a flow of the exhaust gas G, and the outflow end surface 15 serves as an end surface where the exhaust gas G flows out. In a state where the exhaust gas purifying filter 1 is not disposed in the flow of the exhaust gas G, the inflow end surface 14 and the outflow end surface 15 refer to relative surfaces in the axial direction Y of the exhaust gas purifying filer 1. That is, when either one end surface is an inflow end surface 12, the other is the outflow end surface 15. For example, the inflow end surface 14 may be referred to as a first end surface and the outflow end surface 15 may be referred to as a second end surface.

The exhaust gas purifying filter 1 includes an opening sealed portion 16. The opening sealed portion 16 alternately seals the inflow end surface 14 or the outflow end surface 15, for example. The opening sealed portion 16 is formed of ceramic such as cordierite, but may be formed of other material. In FIG. 2, a plug-shaped opening sealed portion 16 is formed, but the shape of the opening sealed portion 16 is not limited to any particular shape as long as the inflow end surface 14 or the outflow end surface 15 is sealed. Although illustration of constituents are omitted, for example, a part of the partitions may be deformed in the inflow end surface 14 or the outflow end surface 15, whereby the opening sealed portion 16 can be formed. In this case, since part of the partitions forms the opening sealed portion 16, the partition 12 and the opening sealed portion 16 are integrally and continuously formed.

As cells 13, the cells 13 include, for example, first cells 131 and second cells 132. As shown in FIG. 2, the first cells 131 are open, for example, at the inflow end surface 14 as an inflow side of the exhaust gas, and are sealed at the outflow end surface 15 by the opening sealed portion 16. The second cells 132 are open, for example, at the outflow end surface 15 as an outflow side of the exhaust gas, and are sealed at the inflow end surface 14 by the opening sealed portion 16.

The first cells 131 and the second cells 132 are alternately arranged in parallel, for example, to be positioned adjacently with each other in the lateral direction X orthogonal to the axial direction and also in the vertical direction Z orthogonal to both the axial direction X and the lateral direction X. In other words, when viewing the inflow end surface 14 or the outflow end surface 15 of the exhaust gas purifying filter 1 in the axial direction Y, the first cells 131 and the second cells 132 are arranged, for example, to be in a checkered pattern.

The partition 12 separates the adjacently positioned first cell 131 and second cell 132. In the partition 12, as shown in FIG. 3 (a), numerous pores 121 are formed by a pore wall 124. The pore 121 includes communicating pores 121c that communicates between the first cell 131 and the second cell 132, and non-communicating pores (not shown) that does not communicate between the first cell 131 and the second cell 132. As shown in an experiment example, the communicating pores 121c can be observed by an electron microscopic inspection of the cross-section of the partition 12. In FIG. 3 (a), the pores 121 are simply illustrated as a two-dimensional image. However, most of the pores 121 may three-dimensionally intersect each other. The pore 121 serves as a passage of the exhaust gas G in the partition 12. The exhaust gas G passes through the pore 121, thereby collecting the PM contained in the exhaust gas G on the pore wall surface 124a. The pore wall surface 124a is a portion where the pore wall 124 faces the pore 121. Also, the HC purifying catalyst is carried on the pore wall 124, whereby toxic gas components such as HC contained in the exhaust gas G are purified by the HC purifying catalyst. The cell 13 serves as a passage of the exhaust gas G similar to the pore 121, where the PM is collected on a passage surface 125 of the partition 12, and the HC purifying catalyst is carried on the passage surface 125, thereby purifying the toxic gas component on the passage surface 125 as well. The passage surface 125 is a portion where the partition 12 faces the cell 13.

The number of communicating pores is appropriately increased, whereby a reduction of the pressure loss and an improvement of the PM collection ratio can be achieved. The number of communicating pores, and the shape thereof can be adjusted with, for example, a porosity and an average pore diameter as an index. In view of appropriately increasing the number of communicating pores and securing required strength when assembling the exhaust gas purifying filter 1, the porosity may preferably be from 50% to 70%, more preferably be from 53% to 67%, and further more preferably be from 55% to 65%. From a similar point of view, the average pore diameter may preferably be from 12 μm to 24 μm, more preferably be from 13 μm to 23 μm, and further more preferably be from 14 μm to 22 μm. The porosity and the average pore diameter are measured based on the theory of mercury penetration method as shown in the experiment example.

Figure 4A:
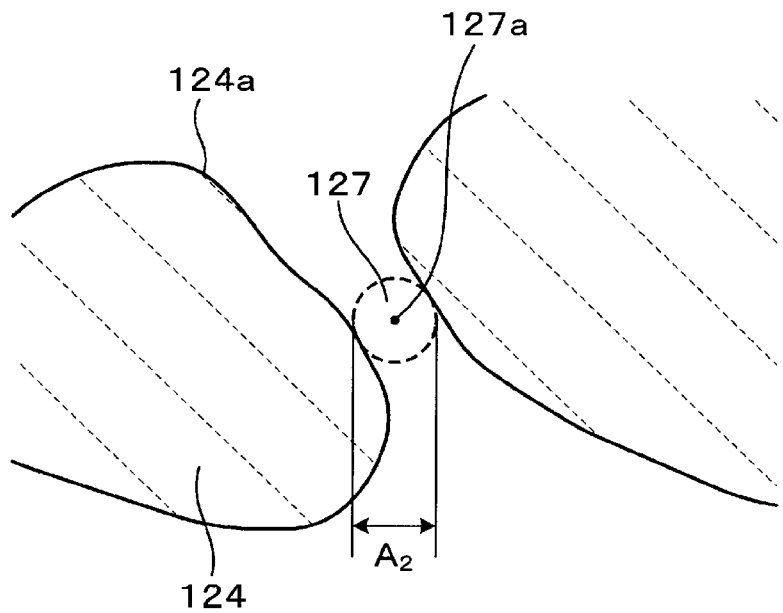
FIG. 4 is a set of diagrams in which FIG. 4 (a) is an enlarged cross-sectional schematic view of a partition showing a narrow part according to the first embodiment and FIG. 4 (b) is an enlarged cross-sectional schematic view of a partition showing a narrow part in which a HC purifying catalyst is carried according to the first embodiment.
Figure 4B:
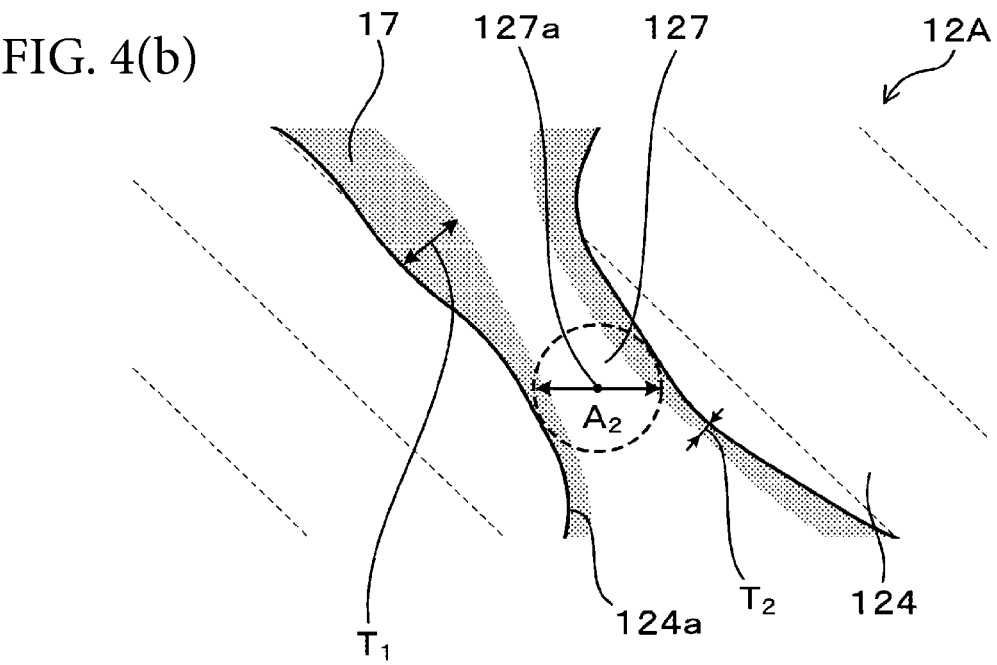
Figure 5A:
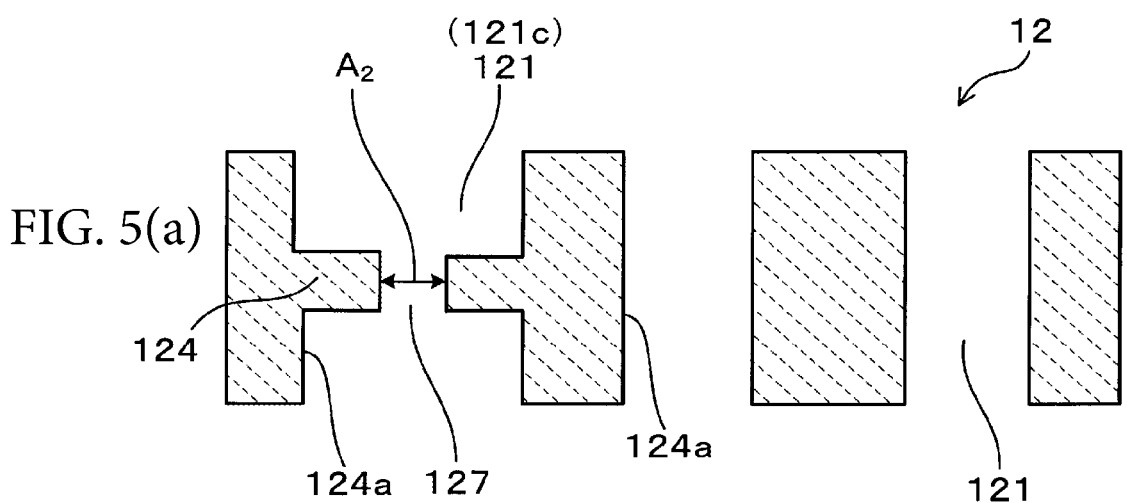
FIG. 5 is a set of diagrams in which FIG. 5 (a) is a schematic view showing a narrow part which is simplified in a cross-section of the partition according to the first embodiment and FIG. 5 (b) is a schematic view showing a simplified narrow part in a cross-section of the partition in which a HC purifying catalyst is carried according to the first embodiment.
Figure 5B:
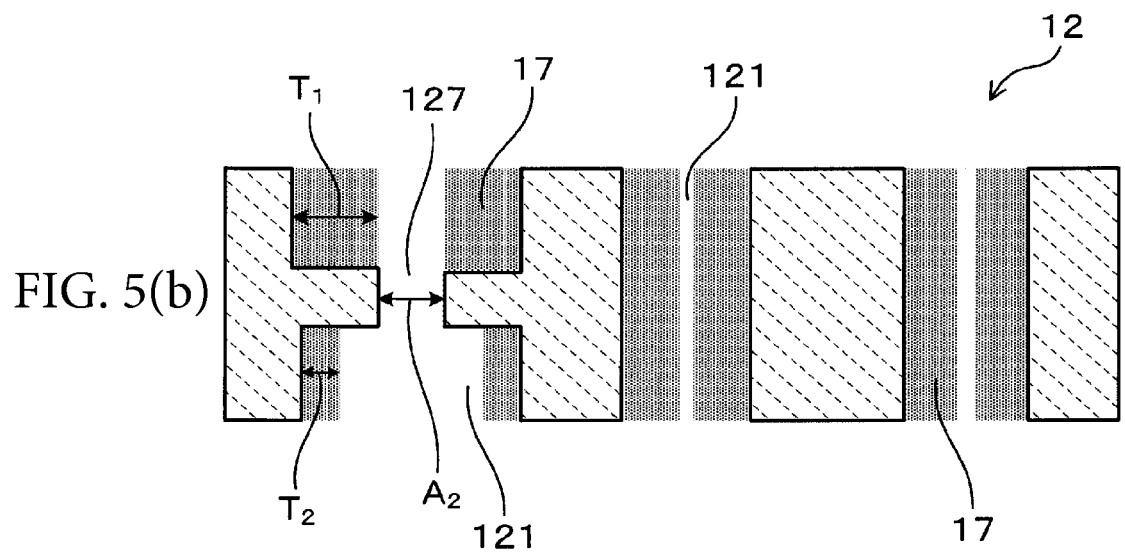

As shown in FIG. 4 (b), for example, the catalyst layer 17 is formed on the pore wall surface 124a of the partition 12. The catalyst layer 17 may continuously formed or discontinuously formed. The catalyst layer 17 is formed on the passage surface 125 of the partition 12 as well.

The catalyst layer 17 contains HC purifying catalyst. As the purifying catalyst, a three-way catalyst composed of noble metals such as Pt, Rh, Pd can be utilized. In this case, the HC catalyst is capable of purifying toxic gas components such as CO and NOx in addition to the HC. The catalyst layer 17 may contain alumina and auxiliary catalyst. An alumina, ceria, zirconia, ceria-zirconia solid solution and the like are exemplified.

As shown in FIG. 3 (a) and FIG. 3 (b), the pore 121 includes an opening end 126 which is opened at the passage surface 125. The pore diameter in the opening end 126 is an opening diameter $A_1$, and the opening diameter $A_1$ is expressed by a diameter of a circle being inscribed to the opening end 126 in the cross-section of the partition 12 sectioned along the wall thickness direction. A diameter of the inscribed circle is referred to as an equivalent circle diameter. The partition 12 includes the opening end 126 of which the opening diameter $A_1$ is 50 μm or larger. That is, the partition 12 includes the opening end 126 that satisfies a condition of $A_1 \geq 50$ μm.

Further, the partition 12 includes a narrow part 127 in a region A having a predetermined relation with the opening end 126, in which the narrow part has the pore diameter of 5 μm or more and the pore diameter becomes the minimum in the region A. The narrow part 127 is a pore part positioned between the pore walls 124 of the partitions 12 in the region A. That is, the narrow part 127 is a pore part of which the pore diameter is 5 μm or more and is the minimum in the region A. The narrow part 127 serves as a constriction part of the pore in which the pore diameter thereof is significantly reduced compared to a surrounding portion. The pore diameter $A_2$ of the narrow part 127 is expressed by an equivalent circle diameter. The pore diameter $A_2$ (unit: μm) at the narrow part 127 of the pore 121 is 6% or more of the opening diameter $A_1$ and less than or equal to 20% of the opening diameter $A_1$. Specifically, the pore diameter $A_2$ of the narrow part 127 satisfies a condition $6\% \leq A_2/A_1 \times 100 \leq 20\%$. The pore diameter $A_2$ is 6% or more and 20% or less of the opening diameter $A_1$, whereby the HC removal ratio of the HC purifying catalyst is higher. This is because a thickness difference of the catalyst layer 17 is formed around the narrow part 127 and the HC having faster diffusion rate is sufficiently removed at a portion having large thickness. Further, since the HC purifying performance can be improved without increasing an amount of the HC purifying catalyst to be carried, the pressure loss accompanied by an increase in the amount of the HC purifying catalyst supported can be prevented from increasing. A method of forming the catalyst layer 17 is not specifically limited. However, for example, a method is generally used in which a fluid containing a catalyst such as noble metal is impregnated and baked on the partition 12. The fluid is, for example, a liquid such as a catalytic slurry. For the partition 12 having the narrow part 127, for example, a portion having a larger thickness of the catalyst layer 17 is formed around the narrow part 127 with a catalyst carrying method which is generally used, and the HC removal ratio becomes higher.

The reason why the pore diameter of the narrow part 127 is set to be 5 μm or more is that a portion having no catalyst such as HC purifying catalyst is formed around the narrow part 127 if the pore diameter of the narrow part 127 is less than 5 μm. Generally, the catalyst is carried using the catalytic slurry as described above, but the catalytic slurry cannot pass through the narrow portion 127 of which the pore diameter is less than 5 μm. For a method for carrying the catalyst, for example, a method in which a catalytic slurry flows from the cell 13 to be impregnated in the partition 12, and a method in which the catalytic slurry is impregnated in the partition 12 by suctioning the exhaust gas purifying filter 1 after the catalytic slurry flows into the exhaust gas purifying filter 1 from the cell 13 may be considered, but none of these methods allows the catalytic slurry to pass through the narrow part 127 of which the pore diameter is less than 5 μm. As a result, as described above, a portion is produced where no catalyst is carried. Hence, the pore diameter of the narrow part 127 is 5 μm or more.

The narrow part 127 is in a region A of the partition 12 between virtual vertical lines $L_1$ and $L_2$ extending from both ends of the opening end 126 to the passage surface 125. The region A in which the passage surface 125 facing the first cell 131 is defined as a first passage surface 125*a*, and the passage surface 125 facing the second cell 132 is defined as a second passage 125*b* will be described as follows.

The opening end 126 is an end portion of the pore 121 opened at at least the first passage 125*a* and the second passage 125*b*. The opening end 126 may preferably be an end portion of the communicating pores 121*c*. As shown in FIG. 3 (*b*), a predetermined region A is present on a cross-section along the wall thickness direction X, Z of the partition 12. The region A is positioned between a pair of virtual lines $L_1$ and $L_2$ extending from opposing sides of the opening end 126 to the passage surface 125 positioned opposite to the opening end 126 along the wall thickness direction. The virtual lines $L_1$ and $L_2$ each extend from either side of the opening end 126 to a passage surface (e.g. second passage surface 125*b*) opposite to a passage surface where the opening end 126 is present (e.g. first passage surface 125*a*) along the wall thickness direction X, Z. The region A is in the partition 12 and for example, is a region surrounded by a dotted line shown in FIG. 3 (*b*). The both sides of the opening end 126 are end portions in a direction (e.g. a direction orthogonal to the wall thickness direction) along the passage surface 125. Note that the virtual lines $L_1$ and $L_2$ are literally virtual lines and identify the region A. The virtual lines $L_1$ and $L_2$ are not actually drawn on the exhaust purifying filter 1, and the drawing of a range of the region A is not necessary.

The pore diameter $A_2$ and the opening diameter $A_1$ of the narrow part 127 satisfy conditions $A_1 \geq 50$ μm, $A_2 \geq 5$ μm, $6\% \leq A_2/A_1 \times 100 \leq 20\%$ in the region A. The partition 12 may include a single region A or a plurality of regions A which satisfy these conditions. As many regions A as possible may preferably be present. In this case, with the HC purifying catalyst being carried, since many portions of the catalyst layer 17 having larger thickness are formed around the narrow portion 127, the HC purifying performance is further improved. The reason for focusing on a relationship between the opening end 126 and the narrow portion 127 in the region A is as follows. As a method of carrying the catalyst by using the catalytic slurry, generally a method in which the catalytic slurry flows into the exhaust gas purifying filter 1 by pressurizing, or a method of suctioning the exhaust gas purifying filter 1 in which the catalytic slurry is impregnated, may be employed. In either method, the catalytic slurry flows into the pore 121 such as the communicating pores from the opening end 126 with a pressure produced in the pressurization or suction and a pressure difference between the opening end and a termination end as a driving force. At this time, the catalytic slurry tends to pass through the shortest passage in a plurality of passages formed by, for example, the communicating pores, through which the catalytic slurry passes. As a result, the catalyst slurry flowing from the opening end 126 forms a catalyst layer 17 having a larger thickness at a portion at which the passage resistance is high (i.e. narrow portion 127). Therefore, the relationship between the opening end 126 and the narrow part 127 in the region A is important. Note that the above-described terminal end is a portion where the communicating pores is opened to the passage surface 125, and is an opening portion opposite to the opening end 127. In the case where the opening end 126 is an input side of the catalytic slurry, the terminal end is a output side, or in the case where the terminal end is an input side of the catalytic slurry, the opening end 126 is the output side.

Also, generally, the exhaust gas purifying filter 1 is formed to have a porosity ranging from 50% to 70%, and an average pore diameter ranging from 10 μm to 30 μm. The exhaust gas purifying filter has many communicating pores. As described above, since most of the communicating pores are mutually connected, as shown in FIG. 3(*a*) and FIG. 3(*b*), the opening end 126 and the narrow part 127 are likely to be connected by the pore 121. In other words, a fluid passage is formed by the pore 121 that communicates between the opening end 126 and the narrow part 127. For example, in the case where a fluid such as a catalytic slurry is used for carrying the HC purifying catalyst, the passage resistance becomes high at the narrow part 127 when the fluid flows through the above-described passage. Hence, the catalyst layer 17 is readily carried with a large thickness at at least a localized portion around the narrow part 127. As a result, a portion where the catalyst layer 17 has a large thickness is readily formed around the narrow portion 127. Since the higher the porosity being set, the more readily the opening end 126 and the narrow part 127 are connected by the pore 121, the above-mentioned tendency is remarkable. Accordingly, a portion between the opening end 126 and the narrow part 127 may preferably be communicated by the pore 121. FIG. 3 (*b*) illustrates a case where the opening end 126 and the narrow part 127 are communicated by a passage formed by the pore 121 existing in the region A, but the opening end 126 and the narrow part 127 may be communicated by a passage outside the region A. Even in this case, a portion where the catalyst layer 17 has a large thickness can readily be formed around the narrow portion 127.

In the partition 12, pores 121 having various pore diameters are present. The HC purifying catalyst tends to be carried by the pores 121 with the same amount of the HC purifying catalyst. Hence, in the pore 121 having small pore diameter, for example, less than 11 μm, the thickness of the catalyst layer 17 at the pore wall surface 124*a* becomes larger. In other words, by increasing the number of pores having a diameter of 11 μm or less, the region having large thickness of the catalyst layer 17 becomes larger. As a result, the HC purifying performance is more improved. In this viewpoint, the pore volume ratio where pore diameter measured based on the mercury penetration method is less than or equal to 11 μm, may preferably be 1.5% or more, more preferably be 3% or more, and further more preferably be 4% or more. Note that the pore volume ratio refers to the ratio of pore volume having a predetermined pore diameter to the whole pore volume, which is calculated by the pore diameter distribution measured in accordance with the mercury penetration method as shown in the experiment example.

On the other hand, when the pore volume ratio where the pore diameter is 11 μm or less increases, the passage resistance becomes high and causes an increase in the pressure loss. From a viewpoint of reducing the pressure loss sufficiently, the pore volume ratio where the pore diameter is 11 μm or less may preferably be 20% or less.

In the exhaust gas purifying filter 1, a catalyst layer 17 is formed, for example. When prioritizing the PM collection properties and pressure loss properties, the supported amount of the catalyst layer 17 may preferably be 30 g/L or more, or less than 80 g/L. In this case, after forming the catalyst layer, the pores 121 in the partition 12 can be prevented from being crushed by the catalyst layer 17. As a result, a decrease in the collection ratio after forming the catalyst layer 18 and an increase in the pressure loss can be avoided. Hence, the PM collecting properties and the pressure loss properties can be maintained at high level. On the other hand, when prioritizing purifying the toxic gas component such as HC, the carrying amount of the catalyst layer 17 may preferably be 80 g/L or more, and less than or equal to 150 g/L. In this case, since the contact frequency between the gas component and the catalyst component is increased, the purifying performance for the gas component is improved.

In a cross-section of the partition 12 sectioned along a wall thickness direction, the catalyst layer 17 formed around the narrow part 127 may preferably have a thickness difference between portions in the opposing sides of the narrow part 127. In this case, a portion having larger thickness and a portion having smaller thickness are present in the opposing sides of the narrow part 127. Then, HC having a faster diffusion rate is effectively removed at the portion having the larger thickness.

The portions having a larger thickness and a smaller thickness can be determined based on a predetermined region surrounding the center of the narrow part 127. Hereinafter, this predetermined region is referred to as a narrow region. The range of the narrow region 12A will be detailed in the experiment example section. As shown in FIG. 4 (a) and FIG. 4 (b), in the cross-section of the partition 12, the narrow region 12A is present, which surrounds the center 127a of the narrow part 127. The center 127a of the narrow part 127 is the center of the inscribed circuit of the narrow part 127. In the narrow region 12A, portions having a large thickness and portions having a small thickness may be present, where the boundary thereof is the center of the narrow part 127, extending in a direction along a pass positioned between the pore walls 124 where the exhaust gas G flows. In the cross-section of the partition wall, the direction along a pass positioned between the pore walls 124 where the exhaust gas G flows, refers to a direction orthogonal to the normal direction of the pore wall surface 124a. As described above, conditions of $A_1 \geq 50$ μm, 6% $A_2/A_1 \times 100 \leq 20\%$ are satisfied, whereby the portion having a large thickness and the portion having a small thickness are formed in the opposing sides of the narrow part 127 in the exhaust gas purifying filter 1 where the catalyst layer 17 is formed. Note that such a difference in thickness of the catalyst layer 17 is considered to be produced because the passage resistance of fluid becomes high according to a carrying method using the fluid such as catalytic slurry.

The thickness $T_1$ of the catalyst layer 17 in the large thickness side is the maximum thickness in the narrow region 12A. The thickness $T_2$ of the catalyst layer 17 in the small thickness side is the minimum thickness in the narrow region 12A. The thickness of the catalyst layer 17 in the pore wall 124a refers to a thickness of the catalyst layer 17 with respect to the normal direction of the pore wall surface 124a. The portions corresponding to the thickness $T_1$ and the thickness $T_2$ are at mutually opposite positions across the center of the narrow part 127. The portion having a large thickness and the portion having a small thickness of the catalyst layer 17 in the narrow region 12A, which surround the center 127a of the narrow part 127 can be observed by, for example, a scanning electron microscope. In order to accomplish a required purification performance around the narrow part 127, preferably, a condition $T_2>0$ may be satisfied, and more preferably, a condition $T_1>0$ may be satisfied.

A condition $T_2/T_1$ may preferably be less than or equal to 0.6. In this case, HC purifying performance is further improved. Considering further improvement of the HC purifying performance, the condition $T_2/T_1$ may preferably be less than or equal 0.5, and more preferably, the condition $T_2/T_1$ may be less than or equal to 0.4.

The exhaust gas purifying filter 1 according to the present embodiment is produced in the following manner. Firstly, a body containing a raw material for forming cordierite is produced. The body is prepared to have cordierite composition containing silica, talc, aluminum hydroxide and the like, and a binder such as methyl cellulose, a pore forming material such as graphite, lubricating oil and water are appropriately added and mixed, thereby producing the body. Note that alumina and kaolin may be added to produce the cordierite composition. As the silica, porous silica can be utilized. In the raw material for forming the cordierite, silica and talc can be a pore forming material 101 which is a raw material for forming the pore. The pore forming material 101 produces a liquid phase component during the baking process, thereby forming the pores 121. For the cordierite raw material, aluminum hydroxide, alumina and kaolin can be an aggregate raw material 102. The aggregate raw material 102 refers to a material for forming portions made of ceramics other than the pore 121.

Subsequently, the body is molded, dried and baked. Thus, the honeycomb structure part 10 is formed. The honeycomb structure part 10 is constituted of the outer skin 11, the partition 12 and the cell 13. The opening sealed portion 16 is formed after or before baking the honeycomb structure part 10. That is, a slurry for forming the opening sealed portion 16 is used to alternately seal the end surface of the cell 13 in the molded body of the honeycomb structure part 10 before or after being baked, and bake them, thereby forming the opening sealed portion 16.

The catalyst layer 17 is formed for the honeycomb structure part 10 before forming the opening sealed portion 16 or the honeycomb structure part 10 after forming the opening sealed portion 16. The catalyst layer 17 is formed by impregnating a catalytic slurry containing noble metal, alumina and co-catalyst, and firing the solid component of the slurry. When impregnating the catalytic slurry, for example, a vacuuming can be performed. According to the present embodiment, since the partition 12 satisfies conditions of the opening diameter $A_1 \geq 50$ μm, 6% $\leq A_2/A_1 \times 100 \leq 20\%$, the passage resistance for the catalytic slurry becomes high at the narrow part 127. Hence, without changing an amount of catalyst, the thickness difference of the catalyst layer 17 is formed around the narrow part 127. Thus, HC is effectively removed at a portion having a large thickness of the catalyst layer.

In the molded body during firing, the pore forming material 101 and the aggregate raw material 102 may be arranged in patterns A to E shown in FIG. 6. Pattern A shows a case where the pore forming material 101 has substantially the same particle diameter and the pore forming material 101a having large particle diameter are positioned close to each other. The pattern B shows a case where the pore forming materials 101a having large particle diameter touch with each other and the pore forming material 101b having small particle diameter touches with the pore forming material 101a having large particle diameter. The pattern C shows a case where the pore forming material 101 has substantially the same particle diameter and many pore forming material 101a having large particle diameter touch each other. The pattern D shows a case where the aggregate raw material 102a having large particle diameter touches each other and the pore forming material 101a having large particle diameter touches with each aggregate raw material 102a. The pattern E shows a case where the aggregate raw material 102b having small particle diameter are arranged between the pore forming material 101a having large particle diameter.

When assuming that the narrow part 127 is formed with respective patterns for arranging the materials exemplified in FIG. 6, the size of the narrow part 127 will be as follows. When the pore forming material 101 touches each other as illustrated by the patterns A to C, the narrow part 127 is expanded. On the other hand, as illustrated by the patterns D and E, the pore forming material 101 and the aggregate raw material 102 are touched each other, and the narrow part 172 can be prevented from being expanded. For example, with the pattern D, a mid-sized narrow part is formed, with the pattern E, a small-sized narrow part is formed. Therefore, the touching patterns between the pore forming material 101 and the aggregate raw material 102 are controlled, whereby the size of the narrow part can be adjusted. Specifically, the pore forming material 101 and the aggregate raw material 102 which have mutually opposite polarity of charges, that is, either positive or negative charge, can be utilized. Thus, the pore diameter $A_2$ can be adjusted to be within the above-described range. Note that charges may be applied to whole pore forming material 101 and whole aggregate raw material 102 used for the manufacturing, or may be applied to a part of pore forming material 101 and a part of aggregate raw material 102 used for the manufacturing.

For applying charges, for example, an anionic dispersant and a cationic dispersant can be utilized. Specifically, the pore forming material 101 and the dispersant may be mixed in advance, and the aggregate raw material 102 and the dispersant may be mixed in advance. Note that, mixing respective materials 101 and 102 with corresponding dispersant is referred to as premixing. With the premixing, dispersant is adhered to the respective materials 101 and 102, thereby making the respective materials charged with opposite polarities, that is, positive charge and negative charge. After the premixing, the pore forming material 101 with the dispersant adhered thereto and the aggregate raw material 102 with the dispersant adhere thereto are further mixed.

When setting a premixing period to be long, the communication properties of the pore 121 may be degraded. Hence, the mixing period should be appropriately adjusted. Further, when the particle diameter of the aggregate raw material 102 in the vicinity of the pore forming material 101 is large, the communication properties of the pore 121 may be degraded. The ratio of the particle diameter between the pore forming material 101 and the aggregate raw material 102 may preferably be adjusted.

The opening diameter $A_1$ (μm) and the pore diameter $A_2$ can be controlled by adjusting the ratio of the particle diameter between the pore forming material 101 and the aggregate raw material 102, type of dispersant, an amount of addition of dispersant, the mixing period, the number of rotations in the extrusion, drying period of the body and the like. As a result, a condition of $A_2/A_1 \times 100$ can be adjusted to be within a predetermined range while maintaining $A_1$ to be larger than or equal to a predetermined value.

First Comparative Embodiment

Figure 7A:
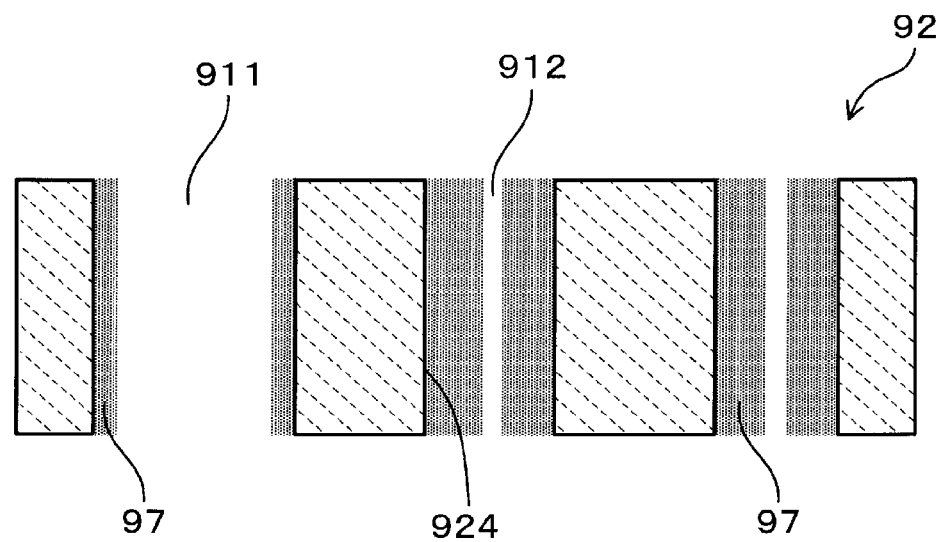
FIG. 7 is a set of diagrams in which FIG. 7 (a) is a schematic view simply showing a cross-section of a partition in which a small amount of HC purifying catalyst is carried according to a comparative example 1 and FIG. 7 (b) is a schematic view simply showing a cross-section of a partition in which a large amount of HC purifying catalyst is carried according to a comparative example 1.
Figure 7B:
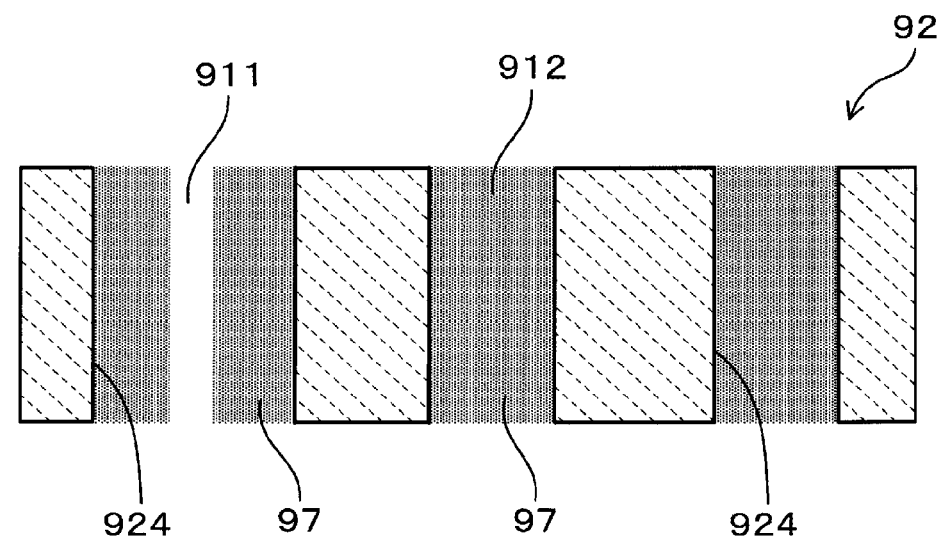

Next, with reference to FIG. 7, a conventional exhaust gas filter in which the pore control is not implemented will be described. In FIG. 7, a partition 92 of the exhaust gas filter according to the present embodiment is illustrated. FIG. 7(a) and FIG. 7(b) schematically show communicating pores in which the communicating pores of the partition 92 (i.e. pores 911 and 912) are simplified. As shown in FIG. 7(a) and FIG. 7(b), in the partition 92 of the exhaust gas filter, various pores 911 and 912 having different pore diameters are formed. In the present embodiment, for the sake of convenience, the pores 911 and 912 will be described differentiating them into the pore 911 having larger pore diameter and the pore 912 having small diameter.

For example, when a catalytic slurry similar to that of the first embodiment is used to form a predetermined amount of the catalyst layer 97 in the partition 12, as shown in FIG. 7(a), the thickness of the catalyst layer 97 is small. As a result, HC, having high diffusion rate in the catalyst layer 97 reacts with catalyst insufficiently and passes through the catalyst layer 97. On the other hand, when increasing the amount of the catalyst in order to improve the purifying performance of HC, as shown in FIG. 7(b), the thickness of the catalyst layer 97 of the large-sized pore 911 becomes larger, but the small-sized pore 912 is closed by the catalyst layer 77. As a result, since small-sized pores 912 having high collection efficiency for PM are closed, the collection efficiency of the exhaust gas purifying filter is lowered. Further, the pressure loss increases.

Experiment Example 1

According to the present example, a plurality of exhaust gas purifying filters 1 having different values of $A_2/A_1 \times 100$ as shown in table 1 are produced. Then, the catalyst layer 17 containing HC purifying catalyst is formed in the partition 12, and the HC removal ratio and the pressure loss are compared and evaluated. The exhaust gas purifying filter 1 is formed in a cylindrical shape in which the diameter is 118 mm, the length in the axial direction Y is 122 mm, containing cordierite as a major component. The exhaust gas purifying filter 1 has a cross-sectional shape of the cell 13 along a direction orthogonal to the axial direction Y which is rectangular. The cell density is 300 cpsi, and the thickness of the partition 12 is 0.220 mm. The amount of catalyst layer 17 is 65 g/L.

Firstly, as a material for forming the cordierite, silica, talc and aluminum hydroxide are prepared. Silica and talc are the pore forming material 101, and aluminum hydroxide is aggregate forming material.

Next, silica, talc and anionic dispersant are mixed with water and stirred for one to two hours, thereby obtaining a first mixture. An amount of addition of anionic dispersant is 2-15 wt % with respect to a total amount 100 wt % of silica and talc. An amount of addition of water is equivalent to a half of the required amount for producing the body. The anionic dispersant is Nopcos Perth 44C manufactured by Sanyo Chemical Industries, Ltd. Moreover, aluminum hydroxide, a cationic dispersant and water are mixed and stirred for one to two hours, thereby obtaining a second mixture. An amount of addition of anionic dispersant is 2-15 wt % with respect to a total amount 100 wt % of silica and talc. An amount of addition of water is equivalent to a half of the required amount for producing the body. The cationic dispersant is Nopcos Perth 092 manufactured by Sanyo Chemical Industries, Ltd.

Next, the first mixture and the second mixture are mixed, and a dispersant, a lubricating oil and a pore forming material are mixed and kneaded. Thus, the body is prepared. The dispersant is polyoxyethylene polyoxypropylene glyceryl ether in which the average molecular amount is 4550. The binder is methyl cellulose.

The body is extrusion-molded and fired at 140 degree C., and the opening sealed portion 16 is formed, thereby obtaining the exhaust gas purifying filter 1. Also, the catalyst layer 17 is formed in the exhaust gas purifying filter 1 with a method similar to that of the first embodiment. According to the present example, an amount of addition of the anionic dispersant, an amount of addition of the cationic dispersant, stirring time and mixing time are changed, thereby obtaining 13 types of exhaust gas purifying filter 1 as shown in table 1.

Next, for the respective exhaust gas purifying filter 1, respective measurement values shown in table 1 are obtained in the following manner.

(Opening Diameter $A_1$ and Ratio of an Opening Diameter $A_1$ to a Pore Diameter $A_2$)

Figure 8A:
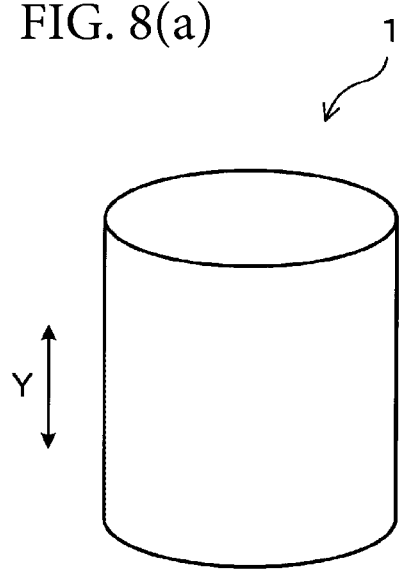
FIG. 8 is a set of diagrams in which FIG. 8 (a) is a schematic view showing an outline of an exhaust gas purifying filter according to an experiment example 1, FIG. 8 (b) is a schematic view showing a sampling position of a measurement sample with respect to the radial direction of the exhaust gas purifying filter according to the experiment example 1 (i.e. cross-sectional view of FIG. 8 (c) sectioned at line VIIIb-VIIIb) and FIG. 8 (c) is a schematic view showing a sampling position of a measurement sample with respect to the axial direction and the radial direction of the exhaust gas purifying filter according to the experiment example 1.
Figure 8B:
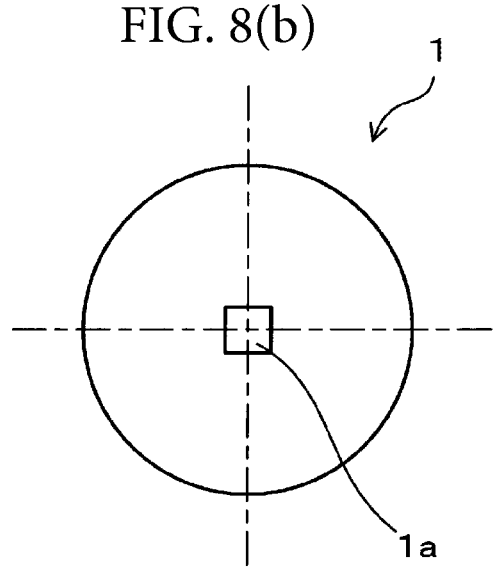
Figure 8C:
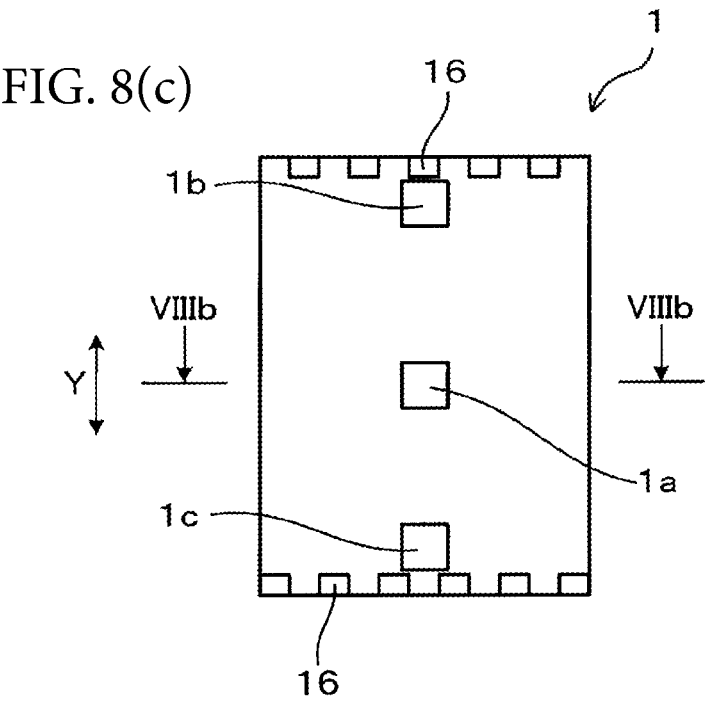
Figure 9C:
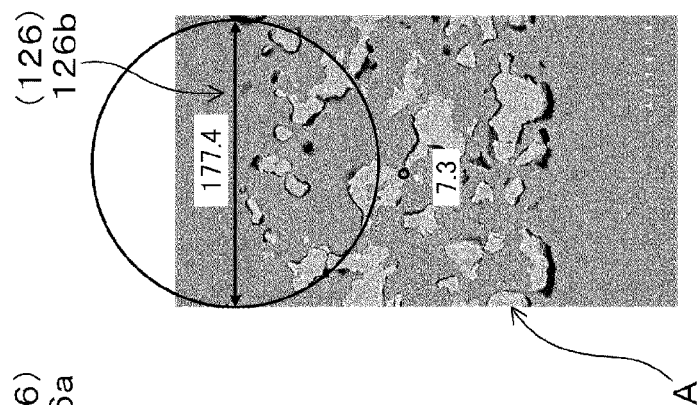
FIG. 9 is a set of diagrams in which FIG. 9 (a) is a photographic image showing an example of a scanning electron microscopic image of a cross-sectioned partition according to the experiment example 1, FIG. 9 (b) is a photographic image showing a predetermined region A corresponding to a first opening end according to the experiment example 1 and FIG. 9 (c) is a photographic image showing a predetermined region A corresponding to a second opening end according to the experiment example 1.
Figure 9B:
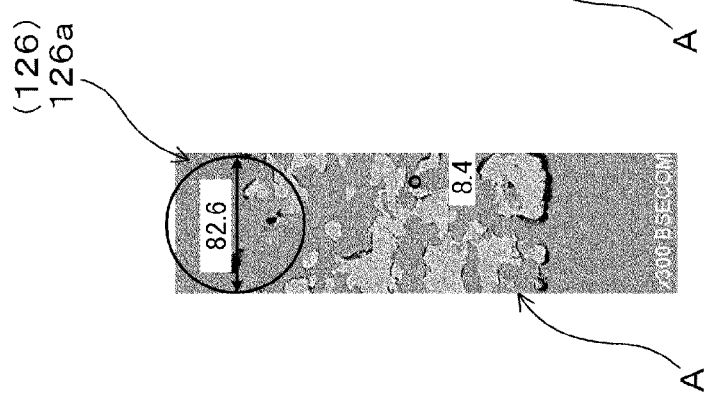
Figure 9A:
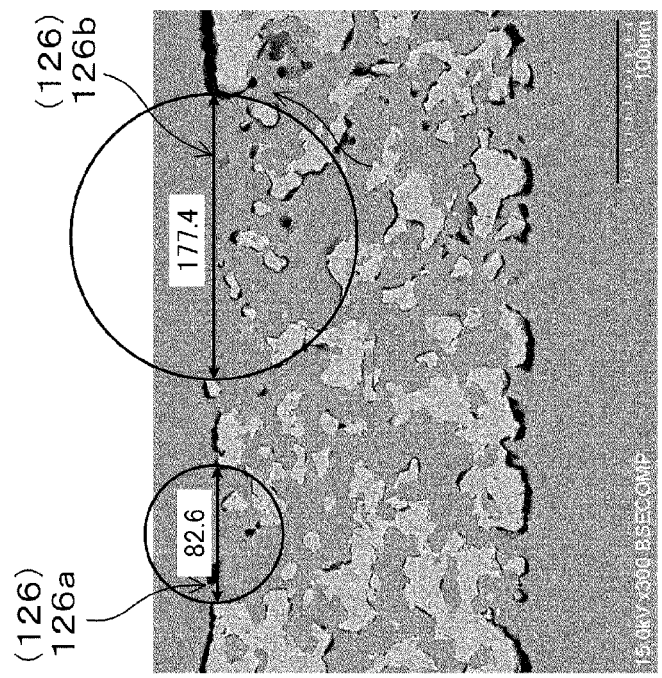

An exhaust gas purifying filter 1 is measured in a state where the catalyst layer 17 is not formed, that is, before forming the catalyst layer. The opening diameter $A_1$ and the pore diameter $A_2$ of the narrow part 137 described in the first embodiment are measured based on a scanning electron microscopic image of a cross-section of the partition 12 of the exhaust gas purifying filter 1. The scanning electron microscope is hereinafter appropriately referred to as an SEM. The observation points of the SEM image are shown in FIG. 8 (a) to FIG. 8 (c). As shown in FIG. 8 (a) to FIG. 8 (c), the observation points are three points with respect to the axial direction Y passing through the center portion in the diameter of the exhaust gas purifying filter 1, which are a center portion 1a, a portion 1b immediately inside the opening sealed portion 16 of an inflow end surface 14 side and a portion 1c immediately inside the opening sealed portion 16 of an outflow end surface 15 side. For the SEM, an S-3400N manufactured by Hitachi High-Technologies Corporation is utilized under a condition where acceleration voltage: 15.0 kV, magnification: 300 to obtain the SEM image of the cross-section of the partition. The SEM image is a backscattered electron image. An example thereof will be shown in FIG. 9 (a). FIG. 9 (a) is a SEM image showing a cross-section of the partition of the exhaust gas purifying filter 1 before forming the catalyst layer (i.e. base material). As shown in FIG. 9(a), many pores 121 are formed in the partition 12, and most of them are communicating pores 121c.

FIG. 9 (a) illustrates the opening end 126 having a diameter of 50 μm or larger at two portions (i.e. first opening end 126a and second opening end 126b) and the diameter $A_1$. As shown in FIG. 9 (a), the opening diameter $A_1$ of the first opening end 126a is 82.6 μm and the opening diameter $A_1$ of the second opening end 126b is 177.4 μm. FIG. 9 (b) illustrates a region A in a range having the above-described relationship with the first opening end 126a, which is extracted from the SEM image shown in FIG. 9 (a). In FIG. 9 (b), a position of the narrow part 127 and the pore diameter $A_2$ thereof are shown, where the pore diameter $A_2$ is 8.4 μm. FIG. 9 (c) illustrates a region A having the above-described relationship with the second opening end 126b, where the region A is extracted from the SEM image shown in FIG. 9 (a). In FIG. 9 (c), a position of the narrow part 127 and the pore diameter $A_2$ thereof are shown, where the pore diameter $A_2$ is 7.3 μm. Note that circles shown in FIG. 9 (a) to FIG. 9 (c) show inscribed circles.

Similar to an example of the opening diameter $A_1$ and the pore diameter $A_2$ shown in FIG. 9 (a) to FIG. 9 (c), the opening diameter $A_1$ and the pore diameter $A_2$ of the respective exhaust gas purifying filter 1 shown in table 1 are measured. In accordance with the result, $A_2/A_1 \times 100$ is calculated. The values of the opening diameter $A_1$ and $A_2/A_1 \times 100$ are shown in table 1. Note that a plurality of values corresponding to the opening diameter $A_1$ and $A_2/A_1 \times 100$ are obtained from three SEM observation points, but table 1 shows their arithmetic mean value.

(Porosity and Average Pore Diameter)

The exhaust gas purifying filter 1 is measured in a state where the catalyst layer 17 is not formed, that is, the exhaust gas purifying filter 1 before forming the catalyst layer is measured. The measurement samples are collected from the partition 12 of the exhaust gas purifying filter 1, and the porosity and the average pore diameter are measured with a mercury porosimeter using the mercury penetration method. The measurement samples are collected at three points which are the same as the observation point of the SEM image. The measurement sample has a substantially rectangular parallelepiped shape in which the length in the axial direction Y is 1 cm, the thickness in the wall thickness direction is 1 cm, the length orthogonal to the axial direction and the wall thickness direction is 1 cm. The measurement result is the arithmetic mean value of the porosity and the average pore diameter of the respective samples. The average pore diameter is also referred to as average pore size. For the mercury porosimeter, an AutoPore IV 9500 manufactured by SHIMADZU CORPORATION is used.

Specifically, the measurement sample is accommodated in a measurement cell of the mercury porosimeter and the pressure in the measurement cell is reduced. Thereafter, mercury is introduced in the measurement cell, and the pore diameter and the pore volume are measured in accordance with the pressure when pressurized and the mercury volume introduced in the pore of the measurement sample.

The pore diameter and the pore volume are measured in a pressure range from 0.5 psia to 20000 psia. Note that 0.5 psia corresponds to $0.35 \times 10^{-3}$ kg/mm$^2$, and 20000 psia corresponds to 14 kg/mm$^2$. The range of the pore diameter corresponding to this pressure range is 0.01 μm to 420 μm. As constants when calculating the pore diameter from the pressure, a contact angle 140 degrees and a surface tension 480 dyn/cm are used. The average pore diameter refers to a pore diameter at 50% of accumulated value of the pore volume. The porosity is calculated with the following equation. Note that the true specific gravity of cordierite is 2.52.

porosity (%)=total pore volume/(total pore volume+ 1/true specific gravity of cordierite)×100

(Pore Volume Ratio in which Pore Diameter is Less than or Equal to 11 μm)

The exhaust gas purifying filter 1 is measured in a state where the catalyst layer 17 is not formed, that is, the exhaust gas purifying filter 1 before forming the catalyst layer is measured. A distribution of the pore diameters in each measurement sample is measured with a mercury porosimeter using the mercury penetration method. The measurement is conducted with similar method and condition for the above-described porosity and average pore diameter. With the distribution of pore diameter, a volume ratio of pore diameter having the pore diameter of less than or equal to 11 μm is calculated.

(Thickness Ratio $T_2/T_1$ of Catalyst Layers Across the Narrow Part)

The exhaust gas purifying filter 1 is measured in a state where the catalyst layer 17 is formed, that is, the exhaust gas purifying filter 1 after forming the catalyst layer is measured. With the SEM image of the cross-section of the partition in the exhaust gas purifying filter 1, the thickness $T_1$ and $T_2$ described in the first embodiment is measured. The scanning electron microscope is hereinafter appropriately referred to as an SEM. The observation points of the SEM image are three points similar to those in the measurement of the opening diameter $A_1$ of the opening end 126 and the pore diameter $A_2$ of the narrow part 127. For the SEM, an S-3400N manufactured by Hitachi High-Technologies Corporation is utilized under a condition where acceleration voltage: 15.0 kV, magnification: 300 to obtain the SEM image of the cross-section of the partition. The SEM image is a backscattered electron image. An example thereof will be shown in FIG. 10 (a). FIG. 10 (a) is a SEM image showing a cross-section of the partition of the exhaust gas purifying filter 1 after forming the catalyst layer (i.e. base material).

FIG. 10 (a) illustrates the opening end 126 having a diameter of 50 μm or larger and the diameter $A_1$. As shown in FIG. 10 (a), the opening diameter $A_1$ of the opening end $A_1$ is 68 μm. FIG. 10 (b) illustrates a part of the region A in a range having the above-described relationship with the first opening end 126a, which is extracted from the SEM image shown in FIG. 10 (b). FIG. 10 (b) illustrates a position of the narrow part 127 with the position of the inscribed circle. FIG. 10 (c) is a SEM image showing a narrow region 12A surrounding the center 127a of the narrow part, which is extracted from the SEM image shown in FIG. 9 (a). FIG. 10 (d) is an enlarged view of FIG. 10 (c), in which the position of the narrow part is indicated by a circle. The narrow region 12A is a region surrounded by a rectangle in which the center of gravity is a position of the center 127a of the narrow part shown in FIG. 4, the length in the wall thickness direction is 12.5 μm and the length in a direction orthogonal to the wall thickness direction is 27 μm. For the narrow region 12A, as described in the first embodiment, the thickness $T_1$ of the catalyst layer 17 having larger thickness and the thickness $T_2$ of the catalyst layer 17 having smaller thickness are measured. Then, the thickness ration $T_2/T_1$ is measured based on these measurement values. The arithmetic mean value of the calculation values at the above-described three points is shown in table 1. The circles shown in FIG. 10 (a) to FIG. 10 (c) are inscribed circles. The reason for focusing on the narrow region 12A surrounded by the rectangle having the above-described predetermined dimension is that the narrow region 12A has an apparent thickness difference between $T_1$ and $T_2$.

(HC Removal Ratio)

Figure 11:
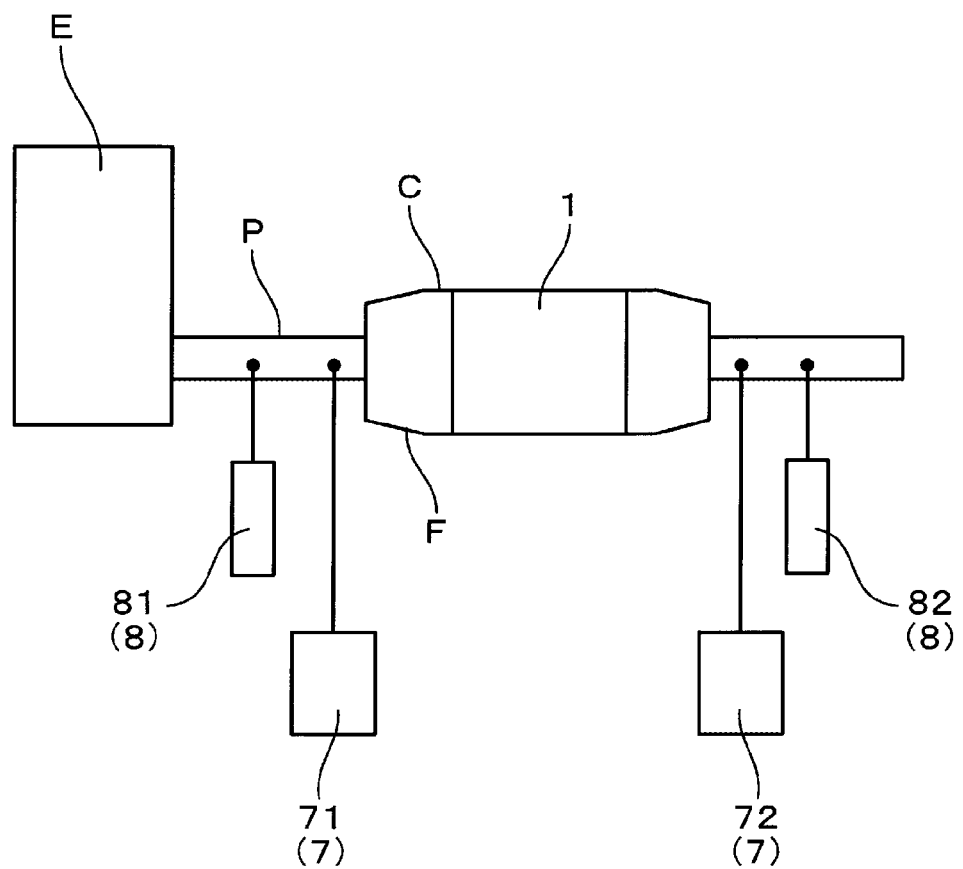
FIG. 11 is a schematic view showing a configuration of measurement equipment for measuring HC removal ratio according to the experiment example 1.

The exhaust gas purifying filter 1 is measured in a state where the catalyst layer 17 is formed, that is, the exhaust gas purifying filter 1 after forming the catalyst layer is measured. As shown in FIG. 11, the exhaust gas purifying filter 1 is attached inside an exhaust pipe P of a gasoline direct injection engine E of which the spec is 2.0 liters engine capacity, natural aspiration and four cylinders. Specifically, a ceramic mat (not shown) is wound around the exhaust purifying filter 1, and the exhaust gas purifying filter 1 is inserted into a filter case C. Next, the filter case C is coupled to the exhaust pipe P of the engine E via a fitting cone, and exhaust gas is made to flow into the exhaust gas purifying filter 1 from the engine E. Thereafter, A/F (i.e. air fuel ratio: air/fuel) value is maintained at 14.4 while monitoring the A/F by an A/F sensor 8, and a gas concentration meter 7 measures the HC concentration in the exhaust gas under a condition where an intake air quantity is 10 g/s, and the engine speed of the engine E is 1500 rpm. For the gas concentration meter 7, a first gas concentration meter 71 for measuring the HC concentration at an inlet side positioned before the exhaust gas flows into the exhaust gas purifying filter 1 and a second gas concentration meter 72 for measuring the HC concentration at an outlet side where the exhaust gas flows out from the exhaust gas purifying filter 1 are used. The first gas concentration meter 71 and the second gas concentration meter are a MEXA-7500 manufactured by HORIBA, Ltd. As the A/F sensor 8, a first A/F sensor for measuring the A/F concentration at an inlet side positioned before the exhaust gas flows into the exhaust gas purifying filter 1 and a second A/F sensor for measuring the A/F concentration at an outlet side where the exhaust gas flows out from the exhaust gas purifying filter 1 are used. A value of A/F: 14.4 refers to an A/F value frequently appears during the engine start operation at the WLTC mode travelling. The condition of the intake air quantity 10 g/s and the engine speed 1500 rpm is determined simulating a low temperature environment when the engine starts, which is low temperature region, for example, and the exhaust gas temperature is 450 degree C. or below. The HC removal ratio is calculated from the inlet side HC concentration measured by the first gas concentration meter 71 and the outlet side HC concentration measured by the second gas concentration meter 72 based on the following equation.

HC removal ratio=100×(inlet side HC concentration−outlet side HC concentration)/inlet side HC concentration (Pressure Loss)

Figure 12:
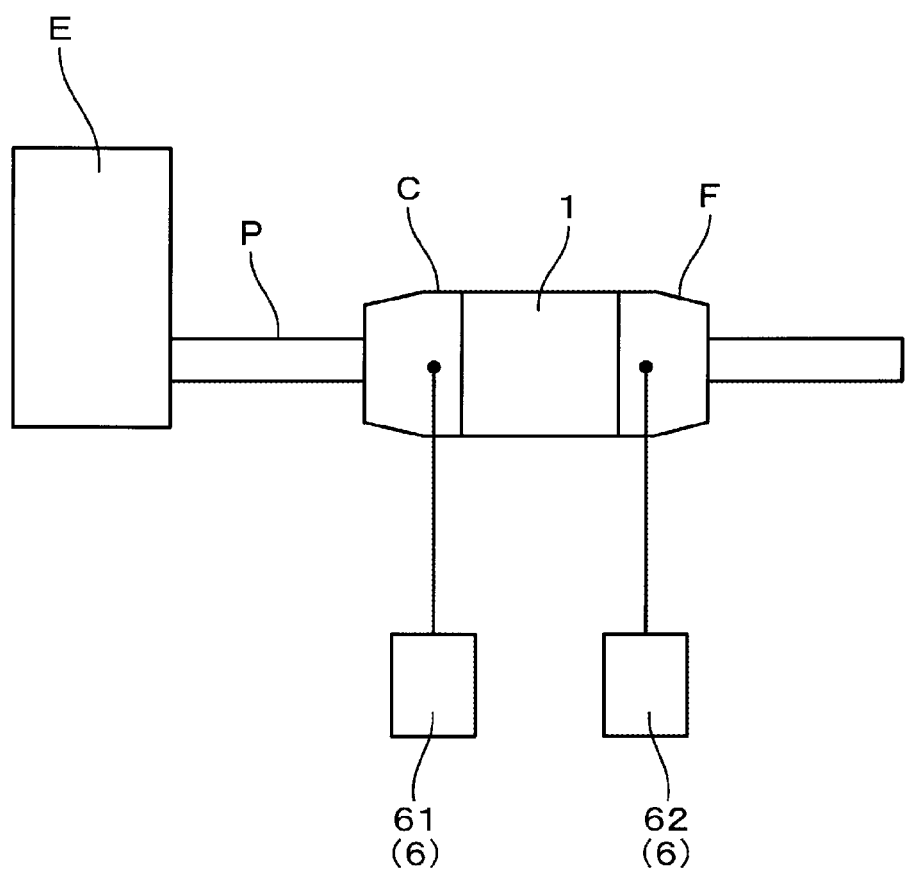
FIG. 12 is a schematic view showing a configuration of measurement equipment for measuring a pressure loss.

The exhaust gas purifying filter 1 is measured in a state where the catalyst layer 17 is formed, that is, the exhaust gas purifying filter 1 after forming the catalyst layer is measured. As shown in FIG. 12, similar to the measurement of the HC removal ratio, the exhaust gas purifying filter 1 is attached inside an exhaust pipe P of a gasoline direct injection engine E of which the spec is 2.0 liters engine capacity, natural aspiration and four cylinders. Then, the exhaust gas is made to flow into the exhaust gas purifying filter 1 from the engine E. With a pressure sensor 6, pressures are measured between a front portion positioned before the exhaust gas purifying filter 1 and a back portion positioned behind the exhaust gas purifying filter 1 to obtain a difference therebetween to be the pressure loss. Note that the front-back direction is a direction along which the exhaust gas flows. The measurement condition is that the temperature is 720 degree C., the exhaust gas flow rate is 11.0 m³/min. Each measurement is performed under an initial state in which PM is not accumulated in the exhaust gas purifying filter 1. The pressure at the front portion is measured by a first pressure sensor 61 and the pressure at the back portion is measured by a second pressure sensor 62.

TABLE 1

| Example/Comparative Example No. | Porosity (%) | Average pore diameter (μm) | $A_1$ (μm) | $A_2$ (μm) | $A_2/A_1 \times 100$ (%) | Pore volume ratio (%) where pore diameter is less than or equal to 11 μm | $T_2/T_1$ | HC removal ratio (%) | Pressure Loss (kPa) |
|---|---|---|---|---|---|---|---|---|---|
| Example 1 | 64 | 22 | 82 | 13.5 | 16.5 | 6.3 | 0.36 | 96.2 | 3.8 |
| Example 2 | 64 | 20 | 131 | 9.4 | 7.2 | 4.1 | 0.14 | 99.1 | 4.5 |
| Example 3 | 64 | 18 | 113 | 15.8 | 14 | 19.5 | 0.3 | 97.2 | 3.9 |
| Example 4 | 64 | 20 | 162 | 17.8 | 11 | 24 | 0.26 | 97.5 | 4.8 |
| Example 5 | 64 | 18 | 155 | 14 | 9 | 13 | 0.28 | 98 | 3.9 |
| Example 6 | 64 | 18 | 130 | 8.1 | 6.2 | 3.8 | 0.04 | 91.2 | 4.5 |
| Example 7 | 64 | 18 | 145 | 26.1 | 18 | 3 | 0.41 | 90.1 | 3.8 |
| Example 8 | 64 | 18 | 132 | 26.1 | 19.8 | 26 | 0.42 | 85.2 | 4.9 |
| Comparative Example 1 | 64 | 18 | 142 | 51.1 | 36 | 1 | 0.73 | 61.1 | 3.6 |
| Comparative Example 2 | 64 | 18 | 90 | 18.9 | 21 | 1.8 | 0.43 | 64 | 3.4 |
| Comparative Example 3 | 64 | 18 | 194 | 9.7 | 5 | 24.5 | 0.05 | 71 | 7.2 |
| Comparative Example 4 | 64 | 18 | 187 | 52.4 | 28 | 28 | 0.62 | 62 | 9.6 |
| Comparative Example 5 | 64 | 18 | 91 | 5.3 | 5.8 | 21 | 0.15 | 76 | 6.4 |

Figure 13:
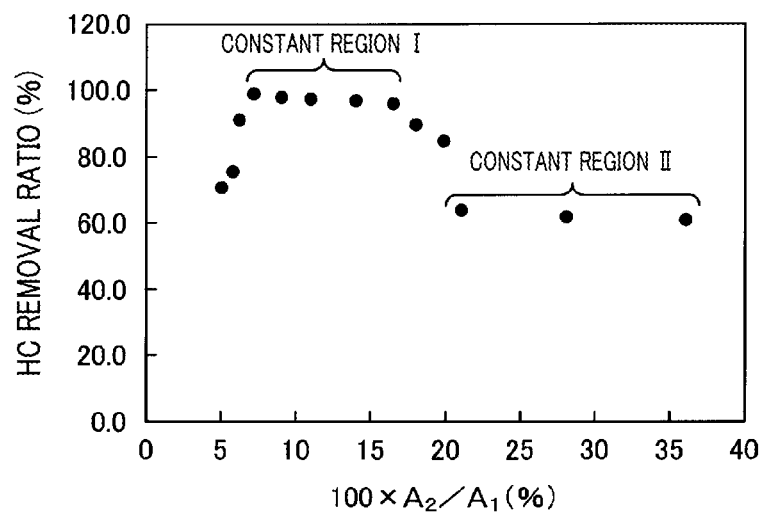
FIG. 13 is a graph showing a relationship between a ratio of an opening diameter $A_1$ to a pore diameter $A_2$ and the HC removal ratio according to the experiment example 1.

As shown in Table 1 and FIG. 13, according to the examples 1 to 8, pores 121 are present in which the opening diameter $A_1$ of the opening end 126 is 50 μm or larger. Further, in the examples 1 to 8, a narrow part 127 is present in the region A having predetermined relationship with the opening end 126, where a relationship between the pore diameter $A_2$ and the opening diameter $A_1$, i.e., $A_2/A_1 \times 100$ is 6% to 20%. As a result, according to the examples 1 to 8, the HC removal ratio is high. This is because, since the pore diameter $A_2$ of the narrow part 127 is 6% to 20% of the opening diameter $A_1$ of the opening end 126, a thickness difference of the catalyst layer 17 is formed around the narrow part 127 after forming the catalyst layer and a portion having larger thickness is formed in the catalyst layer 17. In fact, according to the examples 1 to 8, the thickness ratio $T_2/T_1$ of the catalyst layer 17 is small. Moreover, as shown in Table 1, according to the examples 1 to 8, the pressure loss is low while exhibiting high HC removal ratio.

When the ratio $A_2/A_1 \times 100$ exceeds 20%, the passage resistance in the narrow part 127 becomes small. Hence, the catalyst layer 17 having large thickness is unlikely to be formed around the narrow part 127. Thus, the thickness of the catalyst layer 17 is insufficient from a viewpoint of the HC removal ratio. Accordingly, as shown in Table 1 and FIG. 13, the HC removal ratio becomes low.

The ratio of $A_2/A_1 \times 100$ is required to be 20% or below in order to enhance the HC removal ratio to accomplish better HC purification performance of the exhaust purifying filter 1. However, in order to further enhance the HC removal ratio, the ratio $A_2/A_1 \times 100$ may preferably be 18% or lower, and more preferably 17% or lower. From a similar point of view, the ratio $A_2/A_1$ may preferably be 6% or larger. Also, when considering that the narrow part 127 of the pore 121 is clogged due to the catalyst layer 17 and worsen the exhaust gas flow, the ratio $A_2/A_1 \times 100$ may preferably be 6% or larger in order to suppress degradation of the purifying performance and an increase in the pressure loss. That is, in the case where the ratio $A_2/A_1 \times 100$ is 6% or larger, the HC purifying performance is superior and also an effect of suppressing the pressure loss is significant. Thus, the pressure loss can be lower than 5 kPa which is suitable for a gasoline automobile. Further, the ratio $A_2/A_1 \times 100$ may preferably be 8% or larger which produces a more significant effect of suppressing the pressure loss.

As shown in FIG. 13, the HC removal ratio is high in a range from 6% to 20% of the ratio $A_2/A_1 \times 100$. Also, in this range, a constant region I is present where the HC removal ratio is not substantially changed even when the ratio $A_2/A_1 \times 100$ varies. In the constant region I, for example, since HC is sufficiently diffused inside the catalyst layer around the narrow part 127, if the amount of coating of the catalyst layer 17 is the same, the HC removal ratio is constant. On the other hand, in the case where the ratio $A_2/A_1 \times 100$ is less than 6% or larger than 20%, the HC removal ratio is lowered compared to a case where the ratio $A_2/A_1 \times 100$ ranges from 6% to 20%. Further, in a range exceeding 20%, a constant region II is present where the HC removal ratio is not substantially changed. In the constant region II, the thickness of the catalyst layer 17 around the narrow part 127 is large exceeding a predetermined thickness, and a diffusion distance of HC is constant from a point of view of the gas velocity and the reaction time. As a result, since an amount of reaction between HC and the catalyst is constant, the HC removal ratio is saturated.

Figure 14:
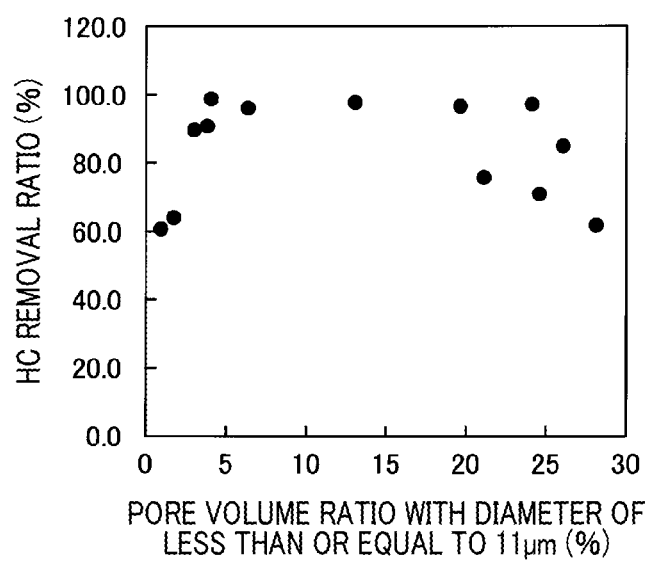
FIG. 14 is a graph showing a relationship between a pore volume ratio in which pore diameter is less than or equal to 11 μm and the HC removal ratio.

Further, as shown in Table 1 and FIG. 14, when the pore volume ratio is 3% or larger where the pore diameter is less than or equal to 11 μm, the HC removal ratio increases. This is because, for the pore 121 where the pore diameter is less than or equal to 11 μm, the thickness of the catalyst layer 17 increases. Hence, in order to enhance the HC removal ratio, the pore volume ratio where the pore diameter is less than or equal to 11 μm may preferably be 3% or larger. In order to further enhance the HC removal ratio, the pore volume ratio where the pore diameter is less than or equal to 11 μm may more preferably be 4% or larger. On the other hand, when the pore volume ratio is less than or equal to 26% where the pore diameter is less than or equal to 11 μm, the HC removal ratio is enhanced. This is because clogging in the pore 121 is suppressed, whereby a portion where the exhaust gas and the catalyst are not touched or unlikely to be touched are prevented from being formed. Accordingly, in order to enhance the HC removal ratio, the pore volume ratio may preferably be less than or equal to 26% where the pore diameter is less than or equal to 11 μm. More preferably, the pore volume ratio may be less than or equal to 24% where the pore diameter is less than or equal to 11 µm, in order to further enhancing the HC removal ratio.

Figure 15:
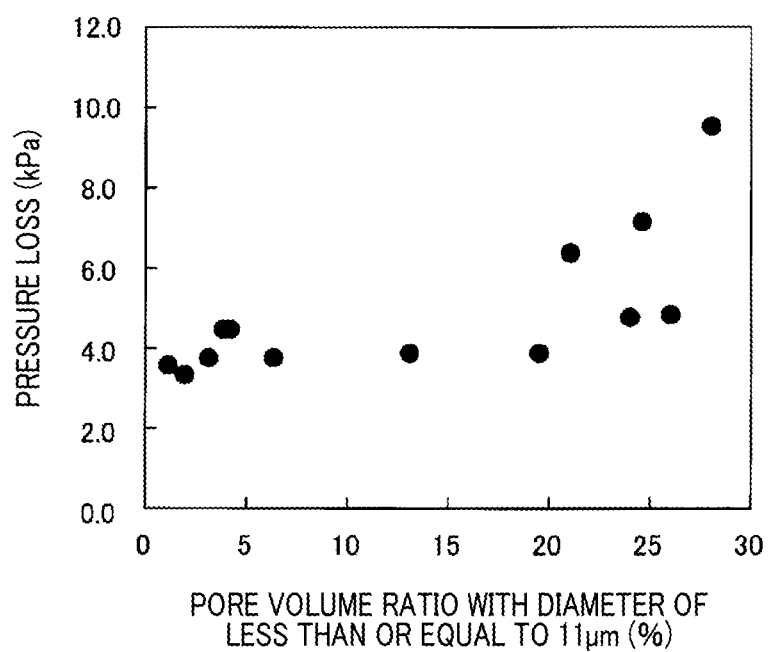
FIG. 15 is a graph showing a relationship between a pore volume ratio in which pore diameter is less than or equal to 11 μm and the pressure loss.

Also, as shown in Table 1 and FIG. 15, when the pore volume ratio is less than or equal to 20% where the pore diameter is less than or equal to 11 µm, the pressure loss is low. This is because the number of pores having small diameters which increase the passage resistance is lowered. Therefore, from the viewpoint of reducing the pressure loss, the pore volume ratio may preferably be less than or equal to 20% where the pore diameter is less than or equal to 11 µm.

Further, according to the exhaust gas purifying filter 1 in which the catalyst layer 17 is actually formed, as shown in Table 1, a larger side thickness $T_1$ and a smaller side thickness $T_2$ in the thickness of the catalyst layer 17 across the narrow part 127 may preferably satisfy a relationship $T_2/T_1 \leq 0.6$. In this case, the HC removal ratio tends to be increased. In order to further increase the HC removal ratio, the relationship $T_2/T_1 \leq 0.4$ may more preferably be satisfied. In the reference symbols used after the experiment example 1, symbols same as those in the existing embodiments indicate similar constituents in the existing embodiments unless otherwise specified.

The present disclosure is not limited to the above-described embodiments and experiment examples, but may be applied to various embodiments without departing from the scope of the present disclosure. For example, the exhaust gas purifying filter 1 is utilized for purifying the exhaust gas of an internal combustion engine such as a diesel engine or a gasoline engine, but the exhaust gas purifying filter 1 may preferably be used for purifying an exhaust gas from the gasoline engine. In other words, the exhaust gas purifying filter 1 may preferably be a gasoline particulate filter. The gasoline particulate filter is referred to as GPF. The GPF is required to have not only a PM purifying performance but also a purifying performance for toxic gas using a coated purification catalyst for the toxic gas component such as HC.

Considering tightened regulation in the future, and case of hybrid vehicles such as plug-in hybrid vehicles (i.e. PHEV) or idling-stop vehicles, intermittent operation of the engine E frequently occurs, thereby increasing an amount of HC emission. Hence, since the exhaust gas purifying filter 1 described in the embodiments and experiment examples effectively purifies HC, excellent HC purifying performance is exhibited. Therefore, the exhaust gas purifying filter 1 is more preferably applied to an exhaust gas purifying apparatus provided with a hybrid engine and an engine controlled by an idling-stop apparatus. In this case, the exhaust gas purifying filter 1 as a component of the exhaust gas purifying apparatus is able to sufficiently purify HC frequently emitted from the engine with the HC catalyst carried by the exhaust gas purifying filter 1, while collecting PM with the filtering structure thereof.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

CONCLUSION

The present disclosure provides an exhaust gas purifying filer capable of exhibiting excellent purifying performance for HC by supporting a catalyst.

One aspect of the present disclosure is an exhaust gas purifying filter used with a HC purifying catalyst carried thereon, including:

a honeycomb structure part having a partition including numerous pores formed therein, and a plurality of cells divided by the partitions, forming a passage for an exhaust gas; and an opening sealed portion that alternately seals an inflow end surface or an outflow end surface of the exhaust gas in the cells, in which in a cross-section of the partition sectioned along a wall thickness direction, each pore is opened at a passage surface facing the cells, having an opening end of which the opening diameter is 50 µm or larger;

the partition includes a narrow part in a region positioned between a pair of virtual lines extending from both ends of the opening end to a passage surface positioned opposite to the opening end along the wall thickness direction, the narrow part having a pore diameter of 5 µm or more, the pore diameter becoming a minimum in the region; and the pore diameter $A_2$ at the narrow part is 6% or more and less than or equal to 20% of the opening diameter $A_1$.

In the cross-section of the partition in the above-described exhaust gas purifying filter, the pore diameter $A_2$ at the narrow part is 6% or more and less than or equal to 20% of the opening diameter $A_1$ of the pore. In such a portion around the narrow part, a catalyst layer is formed with a large thickness at at least a localized portion. In the portion of the catalyst layer having large thickness, since the contact frequency between HC and catalyst is increased, HC reacts sufficiently with the catalyst before passing through the pore. Accordingly, the exhaust gas purifying filter has a high HC removal ratio and excellent HC purifying performance.

According to the above-described aspect, an exhaust gas purifying filter capable of exhibiting excellent HC purifying performance by supporting a catalyst thereon can be provided. Note that reference numbers in brackets in claims indicate correspondence relationship between elements and specific means described in the embodiments which will be described later, and do not limit the technical scope of the present disclosure.

What is claimed is:

1. An exhaust gas purifying filter used with a HC purifying catalyst carried thereon, comprising:
   a honeycomb structure part having a partition including numerous pores formed therein, and a plurality of cells divided by the partition, forming a passage for an exhaust gas; and
   an opening sealed portion that alternately seals an inflow end surface or an outflow end surface of the exhaust gas in the cells,
   wherein
   in a cross-section of the partition sectioned along a wall thickness direction, each pore is open at a passage surface facing the cells, having an opening end of which the opening diameter is 50 µm or larger;
   the partition includes a narrow part in a region positioned between a pair of virtual lines extending from opposing sides of the opening end to a passage surface positioned opposite to the opening end along the wall thickness direction, the narrow part having a pore diameter of 5 µm or more and the pore diameter being a minimum in the region; and
   the pore diameter at the narrow part is 6% or more and less than or equal to 20% of the opening diameter.

2. The exhaust gas purifying filter according to claim 1, wherein the partition is formed such that a pore volume ratio of pores having a pore diameter of less than or equal to 11 µm is 3% or more where pore diameter is measured based on the mercury penetration method.

3. The exhaust gas purifying filter according to claim 2, wherein the pore volume ratio is less than or equal to 20%.

4. The exhaust gas purifying filter according to claim 1, further comprising a catalyst layer containing the HC purifying catalyst which is supported by the partition, wherein a supported amount of the catalyst layer is from 30 g/L to 80 g/L; and in a cross-section of the partition sectioned along a wall thickness direction, the catalyst layer formed around the narrow part has a thickness difference between portions in opposing sides od the narrow part.

5. The exhaust gas purifying filter according to claim 4, wherein a larger side thickness $T_1$ and a smaller side thickness $T_2$ in a thickness of the catalyst layer across the narrow part satisfy a relationship $T_2/T_1 \leq 0.6$.

6. The exhaust gas purifying filter according to claim 1, wherein:

the passage facing the cells has the opening end defined therein and is a first passage surface;

the passage surface positioned opposite to the opening end along the wall thickness direction is a second passage surface; and the narrow part is position between the first passage surface and the second passage surface along the wall thickness direction.

* * * * *